(12) United States Patent
Hoen et al.

(10) Patent No.: US 10,275,068 B2
(45) Date of Patent: *Apr. 30, 2019

(54) FORCE SENSING OF INPUTS THROUGH STRAIN ANALYSIS

(71) Applicant: Apple Inc., Cupertino, CA (US)

(72) Inventors: Storrs T. Hoen, Brisbane, CA (US); Kristina A. Babiarz, San Jose, CA (US); Miguel C. Christophy, San Francisco, CA (US); Romain A. Teil, San Francisco, CA (US); Sinan Filiz, Sunnyvale, CA (US); Vivek Katiyar, Shaker Heights, OH (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/933,113

(22) Filed: Mar. 22, 2018

(65) Prior Publication Data
US 2018/0217708 A1 Aug. 2, 2018

Related U.S. Application Data

(63) Continuation of application No. 14/776,592, filed as application No. PCT/US2013/032399 on Mar. 15, 2013, now Pat. No. 9,952,703.

(51) Int. Cl.
*G06F 3/041* (2006.01)
*G06F 3/0488* (2013.01)

(52) U.S. Cl.
CPC ............ *G06F 3/0414* (2013.01); *G06F 3/041* (2013.01); *G06F 3/0412* (2013.01);
(Continued)

(58) Field of Classification Search
CPC ...... G06F 3/041; G06F 3/0412; G06F 3/0414; G06F 3/0416; G06F 3/0488; G06F 2203/04103
See application file for complete search history.

(56) References Cited

U.S. PATENT DOCUMENTS

| 3,745,502 A | 7/1973 | Watanabe |
| 3,876,912 A | 4/1975 | Sanders |

(Continued)

FOREIGN PATENT DOCUMENTS

| CN | 1527933 A | 9/2004 |
| CN | 1796955 | 7/2006 |

(Continued)

OTHER PUBLICATIONS

Bau, et al., "TeslaTouch: Electrovibration for Touch Surfaces," UIST'10, Oct. 3-6, 2010, New York, New York USA, 10 pages.
(Continued)

*Primary Examiner* — Vijay Shankar
(74) *Attorney, Agent, or Firm* — Brownstein Hyatt Farber Schreck, LLP

(57) ABSTRACT

An electronic device has a force sensor that determines a measure of applied force from a user contacting a cover glass of the device. In one embodiment, a frame at least partially encloses an interior of the electronic device and has an open end. A cover glass covers the open end of the frame and is movably connected to the frame to allow movement of the cover glass in response to one or more forces applied to an external surface of the cover glass. A plurality of strain probes is positioned under the cover glass, between the cover glass and the frame, and is arranged to output a plurality of strain signals response to the one or more forces applied to the cover glass. A force processing module is configured to at least calculate an amount of force applied to the cover glass based on the plurality of strain signals.

20 Claims, 21 Drawing Sheets

(52) U.S. Cl.
CPC .......... *G06F 3/0416* (2013.01); *G06F 3/0488* (2013.01); *G06F 2203/04103* (2013.01)

(56) References Cited

U.S. PATENT DOCUMENTS

| | | | |
|---|---|---|---|
| 4,345,477 A | 8/1982 | Johnson | |
| 4,423,640 A | 1/1984 | Jetter | |
| 4,516,112 A | 5/1985 | Chen | |
| 4,634,917 A | 1/1987 | Dvorsky et al. | |
| 4,695,963 A | 9/1987 | Sagisawa | |
| 4,951,510 A | 8/1990 | Holm-Kennedy et al. | |
| 5,481,905 A | 1/1996 | Pratt | |
| 5,577,021 A | 11/1996 | Nakatani et al. | |
| 5,616,846 A | 4/1997 | Kwasnik | |
| 5,673,041 A | 9/1997 | Chatigny et al. | |
| 5,708,460 A | 1/1998 | Young | |
| 5,790,215 A | 8/1998 | Sugahara | |
| 5,915,285 A | 6/1999 | Sommer | |
| 6,288,829 B1 | 9/2001 | Kimura | |
| 6,369,865 B2 | 4/2002 | Hinata | |
| 6,386,023 B1 | 4/2002 | Sajna et al. | |
| 6,637,276 B2 | 10/2003 | Adderton et al. | |
| 6,812,161 B2 | 11/2004 | Heremans | |
| 6,973,837 B2 | 12/2005 | Barnett | |
| 7,154,481 B2 | 12/2006 | Cross et al. | |
| 7,176,897 B2 | 2/2007 | Roberts | |
| 7,190,350 B2 | 3/2007 | Roberts | |
| 7,196,694 B2 | 3/2007 | Roberts | |
| 7,211,885 B2 | 5/2007 | Nordal et al. | |
| 7,320,253 B2 | 1/2008 | Hanazawa et al. | |
| 7,331,245 B2 | 2/2008 | Nishimura | |
| 7,392,716 B2 | 7/2008 | Wilner | |
| 7,441,467 B2 | 10/2008 | Bloom | |
| 7,456,823 B2 | 11/2008 | Poupyrev et al. | |
| 7,511,702 B2 | 3/2009 | Hotelling | |
| 7,538,760 B2 | 5/2009 | Hotelling et al. | |
| 7,707,894 B2 | 5/2010 | Sumigawa | |
| 7,724,248 B2 | 5/2010 | Saito | |
| 7,726,199 B2 | 6/2010 | Shkel et al. | |
| 7,755,616 B2 | 7/2010 | Jung et al. | |
| 7,800,592 B2 | 9/2010 | Kerr et al. | |
| 7,903,091 B2 | 3/2011 | Lee | |
| 7,992,448 B2 | 8/2011 | Shimazu | |
| 8,020,456 B2 | 9/2011 | Liu et al. | |
| 8,050,876 B2 | 11/2011 | Feen et al. | |
| 8,056,421 B2 | 11/2011 | Sumigawa | |
| 8,077,154 B2 | 12/2011 | Emig et al. | |
| 8,132,468 B2 | 3/2012 | Radivojevic | |
| 8,243,225 B2 | 8/2012 | Kai et al. | |
| 8,266,971 B1 | 9/2012 | Jones | |
| 8,305,358 B2 | 11/2012 | Klinghult et al. | |
| 8,421,483 B2 | 4/2013 | Klinghult et al. | |
| 8,434,369 B2 | 5/2013 | Hou et al. | |
| 8,456,430 B2 | 6/2013 | Oliver et al. | |
| 8,482,545 B2 | 7/2013 | King-Smith et al. | |
| 8,519,974 B2 | 8/2013 | Berggren | |
| 8,531,429 B2 | 9/2013 | Chang | |
| 8,605,053 B2 | 12/2013 | Murphy et al. | |
| 8,640,549 B2 | 2/2014 | Inamori | |
| 8,648,816 B2 | 2/2014 | Homma et al. | |
| 8,669,952 B2 | 3/2014 | Hashimura et al. | |
| 8,669,962 B2 | 3/2014 | Kuan | |
| 8,681,122 B2 | 3/2014 | Pirogov et al. | |
| 8,692,646 B2 | 4/2014 | Lee et al. | |
| 8,695,433 B2 | 4/2014 | Shimazu | |
| 8,711,128 B2 | 4/2014 | Small et al. | |
| 8,780,060 B2 | 7/2014 | Maschmeyer et al. | |
| 8,780,074 B2 | 7/2014 | Castillo et al. | |
| 8,780,543 B2 | 7/2014 | Molne et al. | |
| 8,870,087 B2 | 10/2014 | Coogan et al. | |
| 8,878,803 B2 | 11/2014 | Kimura et al. | |
| 8,982,088 B2 | 3/2015 | Kung | |
| 8,988,384 B2 | 3/2015 | Krah et al. | |
| 9,007,333 B1 | 4/2015 | Wilson | |
| 9,024,910 B2 | 5/2015 | Stephanou et al. | |
| 9,024,918 B2 | 5/2015 | Cok | |
| 9,030,427 B2 | 5/2015 | Yasumatsu | |
| 9,057,653 B2 | 6/2015 | Schediwy et al. | |
| 9,063,599 B2 | 6/2015 | Yanagi et al. | |
| 9,081,460 B2 | 7/2015 | Jeong et al. | |
| 9,099,971 B2 | 8/2015 | Lynn et al. | |
| 9,110,532 B2 | 8/2015 | Ando et al. | |
| 9,116,569 B2 | 8/2015 | Stacy et al. | |
| 9,116,570 B2 | 8/2015 | Lee et al. | |
| 9,128,547 B2 | 9/2015 | Kodani et al. | |
| 9,134,826 B2 | 9/2015 | Andoh | |
| 9,158,407 B2 | 10/2015 | Coulson | |
| 9,182,849 B2 | 11/2015 | Huang et al. | |
| 9,182,859 B2 | 11/2015 | Coulson et al. | |
| 9,200,970 B2 | 12/2015 | Kodani et al. | |
| 9,223,162 B2 | 12/2015 | DeForest et al. | |
| 9,223,445 B2 | 12/2015 | Sleeman et al. | |
| 9,246,486 B2 | 1/2016 | Yang et al. | |
| 9,262,002 B2 | 2/2016 | Momeyer et al. | |
| 9,262,003 B2 | 2/2016 | Kitchens | |
| 9,292,115 B2 | 3/2016 | Kauhanen et al. | |
| 9,304,348 B2 | 4/2016 | Jang | |
| 9,329,719 B2 | 5/2016 | Molne et al. | |
| 9,360,977 B2 | 6/2016 | Aberg | |
| 9,367,173 B2 | 6/2016 | Setlak | |
| 9,383,848 B2 | 7/2016 | Daghigh | |
| 9,417,696 B2 | 8/2016 | DeLuca | |
| 9,417,725 B1 | 8/2016 | Watazu et al. | |
| 9,454,268 B2 | 9/2016 | Badaye et al. | |
| 9,459,734 B2 | 10/2016 | Day | |
| 9,466,783 B2 | 10/2016 | Olien et al. | |
| 9,477,342 B2 | 10/2016 | Daverman et al. | |
| 9,501,167 B2 | 11/2016 | Day | |
| 9,507,456 B2 | 11/2016 | Watazu et al. | |
| 9,519,378 B2 | 12/2016 | Watazu et al. | |
| 9,542,028 B2 | 1/2017 | Filiz et al. | |
| 9,557,857 B2 | 1/2017 | Schediwy | |
| 9,562,814 B2 | 2/2017 | Kulkarni et al. | |
| 9,563,317 B2 | 2/2017 | Sleeman et al. | |
| 9,612,170 B2 | 4/2017 | Vosgueritchian et al. | |
| 9,639,224 B2 | 5/2017 | Lee | |
| 9,658,722 B2 | 5/2017 | Schwartz | |
| 9,665,197 B2 | 5/2017 | Haffenden et al. | |
| 9,665,200 B2 | 5/2017 | Filiz et al. | |
| 9,690,408 B1 | 6/2017 | Krah | |
| 9,690,413 B2 | 6/2017 | Filiz | |
| 9,690,414 B2 | 6/2017 | Kano et al. | |
| 9,729,730 B2 | 8/2017 | Levesque et al. | |
| 9,759,648 B2 | 9/2017 | Serpe | |
| 9,791,968 B2 | 10/2017 | Yang | |
| 9,804,725 B2 | 10/2017 | Andoh | |
| 9,836,171 B2 | 12/2017 | Watazu et al. | |
| 9,841,850 B2 | 12/2017 | Schediwy et al. | |
| 9,851,845 B2 | 12/2017 | Smith et al. | |
| 9,864,450 B2 | 1/2018 | Watazu et al. | |
| 9,874,965 B2 | 1/2018 | Pedder et al. | |
| 9,881,577 B2 | 1/2018 | Wang et al. | |
| 9,886,118 B2 | 2/2018 | Vosgueritchian et al. | |
| 9,904,393 B2 | 2/2018 | Frey et al. | |
| 9,916,942 B2 | 3/2018 | Shedletsky | |
| 9,952,703 B2 * | 4/2018 | Hoen | G06F 3/0414 |
| 10,007,380 B2 | 6/2018 | Yoon et al. | |
| 10,032,592 B2 | 7/2018 | Brooks et al. | |
| 2002/0149571 A1 | 10/2002 | Roberts | |
| 2006/0043508 A1 | 3/2006 | Ohta et al. | |
| 2007/0159561 A1 | 7/2007 | Chien | |
| 2008/0165159 A1 | 7/2008 | Soss et al. | |
| 2008/0218488 A1 | 9/2008 | Yang et al. | |
| 2009/0002199 A1 | 1/2009 | Lainonen et al. | |
| 2009/0267902 A1 | 10/2009 | Nambu et al. | |
| 2009/0316380 A1 | 12/2009 | Armstrong | |
| 2010/0103115 A1 | 4/2010 | Hainzl | |
| 2010/0117809 A1 | 5/2010 | Dai et al. | |
| 2010/0123686 A1 | 5/2010 | Klinghult et al. | |
| 2011/0045285 A1 | 2/2011 | Saiki et al. | |
| 2011/0248839 A1 | 10/2011 | Kwok et al. | |
| 2011/0261021 A1 | 10/2011 | Modarres et al. | |
| 2011/0285660 A1 | 11/2011 | Prabhu et al. | |
| 2012/0019448 A1 | 1/2012 | Pitkanen et al. | |

(56) References Cited

U.S. PATENT DOCUMENTS

| | | |
|---|---|---|
| 2012/0038577 A1 | 2/2012 | Brown et al. |
| 2012/0105367 A1 | 5/2012 | Son et al. |
| 2012/0127136 A1 | 5/2012 | Schneider et al. |
| 2012/0154299 A1 | 6/2012 | Hsu et al. |
| 2012/0188198 A1 | 7/2012 | Jeong et al. |
| 2012/0293491 A1 | 11/2012 | Wang et al. |
| 2013/0074988 A1 | 3/2013 | Chou |
| 2013/0141365 A1 | 6/2013 | Lynn et al. |
| 2013/0147739 A1 | 6/2013 | Aberg et al. |
| 2013/0154933 A1 | 6/2013 | Sheik-Nainar |
| 2013/0155059 A1 | 6/2013 | Wang et al. |
| 2013/0215056 A1 | 8/2013 | Johansson et al. |
| 2013/0222306 A1 | 8/2013 | Aberg et al. |
| 2013/0328803 A1 | 12/2013 | Fukushima et al. |
| 2013/0333922 A1 | 12/2013 | Kai et al. |
| 2014/0085253 A1 | 3/2014 | Leung et al. |
| 2014/0118635 A1 | 5/2014 | Yang |
| 2014/0191973 A1 | 7/2014 | Zellers et al. |
| 2014/0327847 A1 | 11/2014 | Park et al. |
| 2015/0002452 A1 | 1/2015 | Klinghult |
| 2015/0101849 A1 | 4/2015 | Bockmeyer et al. |
| 2015/0116260 A1 | 4/2015 | Hoen et al. |
| 2015/0242037 A1 | 8/2015 | Pedder et al. |
| 2015/0268725 A1 | 9/2015 | Levesque et al. |
| 2015/0301684 A1 | 10/2015 | Shimamura |
| 2015/0331517 A1 | 11/2015 | Filiz et al. |
| 2016/0003697 A1 | 1/2016 | Okamoto et al. |
| 2016/0035290 A1 | 2/2016 | Kim et al. |
| 2016/0041672 A1 | 2/2016 | Hoen et al. |
| 2016/0062517 A1 | 3/2016 | Meyer et al. |
| 2016/0077649 A1 | 3/2016 | Ando et al. |
| 2016/0117035 A1 | 4/2016 | Watazu et al. |
| 2016/0147353 A1 | 5/2016 | Filiz et al. |
| 2016/0306481 A1 | 10/2016 | Filiz et al. |
| 2016/0357297 A1 | 12/2016 | Picciotto et al. |
| 2017/0031495 A1 | 2/2017 | Smith |
| 2017/0090655 A1 | 3/2017 | Zhang et al. |
| 2017/0191884 A1 | 7/2017 | Vosgueritchian et al. |
| 2017/0261387 A1 | 9/2017 | Vosgueritchian et al. |
| 2017/0269757 A1 | 9/2017 | Filiz et al. |
| 2017/0285799 A1 | 10/2017 | Iuchi et al. |
| 2017/0285864 A1 | 10/2017 | Pedder et al. |
| 2018/0059839 A1 | 3/2018 | Kim et al. |
| 2018/0067612 A1 | 3/2018 | Smith |
| 2018/0074638 A1 | 3/2018 | Chiang et al. |
| 2018/0157363 A1 | 6/2018 | Vosgueritchian et al. |

FOREIGN PATENT DOCUMENTS

| | | |
|---|---|---|
| CN | 1860432 | 11/2006 |
| CN | 101017419 | 8/2007 |
| CN | 101071354 | 11/2007 |
| CN | 01201277 A | 6/2008 |
| CN | 101243383 | 8/2008 |
| CN | 101950224 | 1/2011 |
| CN | 102012772 | 4/2011 |
| CN | 102047088 | 5/2011 |
| CN | 102165400 | 8/2011 |
| CN | 02175362 A | 9/2011 |
| CN | 102368191 | 3/2012 |
| CN | 102460351 | 5/2012 |
| CN | 102591519 | 7/2012 |
| CN | 102822779 | 12/2012 |
| CN | 103026327 | 4/2013 |
| CN | 103069365 | 4/2013 |
| CN | 103197821 | 7/2013 |
| CN | 103336562 | 10/2013 |
| CN | 103582807 | 2/2014 |
| CN | 04461655 U | 7/2015 |
| CN | 04576454 U | 8/2015 |
| CN | 104866134 | 8/2015 |
| CN | 105444662 | 3/2016 |
| EP | 0332365 | 9/1989 |
| EP | 0467562 | 1/1992 |
| EP | 1840714 | 10/2007 |
| EP | 2120136 | 11/2009 |
| EP | 2381340 | 10/2011 |
| EP | 2629075 | 8/2013 |
| FR | 2907563 | 4/2008 |
| JP | 201039458 A | 2/2010 |
| JP | 2010197066 | 9/2010 |
| WO | WO 96/038833 | 12/1996 |
| WO | WO 02/035461 | 5/2002 |
| WO | WO 07/074800 | 7/2007 |
| WO | WO 08/076393 | 6/2008 |
| WO | WO 11/156447 | 12/2011 |
| WO | WO 12/168892 | 12/2012 |
| WO | WO 13/177322 | 11/2013 |
| WO | WO 15/106183 | 7/2015 |
| WO | WO 15/158952 | 10/2015 |
| WO | WO 16/029354 | 3/2016 |

OTHER PUBLICATIONS

Feist, "Samsung snags patent for new pressure sensitive touchscreens," posted on AndroidAuthority.com at URL: http://www.androidauthority.com/samsung-patent-pressure-sensitive-touchscreens-354860, Mar. 7, 2014, 1 page.

Rausch, "Printed piezoresistive strain sensors for monitoring of light-weight structures," SENSOR+TEST Conferences 2011—SENSOR Proceedings, pp. 216-220.

Schweizer, "Electrical characterization and investigation of the piezoresistive effect of PEDOT:PSS thin films," A Thesis Presented to the Academic Faculty in Partial Fulfillment of the Requirements for the Degree Master of Science of Electrical and Computer Engineering, Georgia Institute of Technology, Apr. 2005, 89 pages.

Takamatsu, et al., "Transparent conductive-polymer strain sensors for touch input sheets of flexible displays," *Journal of Micromechanics and Microengineering*, vol. 20, 2010, 6 pages.

Tsai, et al., "Fabrication of Graphene-based Micro Strain Gauge," NPL Management Ltd.—Internal, Oct. 15-16, 2012, 1 page.

\* cited by examiner

FORCE SENSING OF INPUTS THROUGH STRAIN ANALYSIS

CROSS-REFERENCE TO RELATED APPLICATIONS

This application is a continuation of U.S. patent application Ser. No. 14/776,592, filed Sep. 14, 2015, entitled "Force Sensing of Inputs Through Strain Analysis," which is a 35 U.S.C. § 371 application of PCT/US2013/032399, filed Mar. 15, 2013, entitled "Force Sensing of Inputs Through Strain Analysis," the contents of which are incorporated herein by reference as if fully disclosed herein.

TECHNICAL FIELD

This application generally relates to the use of force as an input to a computing device, and more particularly to sensing force in a computing device and correlating the force to an input command to execute a property or command of the device.

BACKGROUND

Touch devices generally provide for identification of positions where the user touches the device, including movement, gestures, and other effects of position detection. For a first example, touch devices can provide information to a computing system regarding user interaction with a graphical user interface (GUI), such as pointing to elements, reorienting or repositioning those elements, editing or typing, and other GUI features. For a second example, touch devices can provide information to a computing system suitable for a user to interact with an application program, such as relating to input or manipulation of animation, photographs, pictures, slide presentations, sound, text, other audiovisual elements, and otherwise.

It sometimes occurs that, when interfacing with a GUI, or with an application program, it would be advantageous for the user to be able to indicate an amount of force applied when manipulating, moving, pointing to, touching, or otherwise interacting with, a touch device. For example, it might be advantageous for the user to be able to manipulate a screen element or other object in a first way with a relatively lighter touch, or in a second way with a relatively more forceful or sharper touch. In one such case, it might be advantageous if the user could move a screen element or other object with a relatively lighter touch, while the user could alternatively invoke or select that same screen element or other object with a relatively more forceful or sharper touch.

Each of these examples, as well as other possible considerations, can cause one or more difficulties for the touch device, at least in that inability to determine an amount of force applied by the user when contacting the touch device might cause a GUI or an application program to be unable to provide functions that would be advantageous. When such functions are called for, inability to provide those functions may subject the touch device to lesser capabilities, to the possible detriment of the effectiveness and value of the touch device. On the other hand, having the ability to provide those functions might provide the touch device with greater capabilities, to the possible advantage of the effectiveness and value of the touch device.

SUMMARY

Examples of embodiments described herein may take the form of an electronic device, comprising a frame at least partially enclosing an interior of the electronic device, the frame having an open end; a cover glass covering the open end of the frame, the cover glass movably connected to the frame to allow movement of the cover glass in response to one or more forces applied to an external surface of the cover glass; a plurality of strain probes arranged to output a plurality of strain signals responsive to the force applied to the cover glass; and a force processing module configured to at least calculate an amount of force applied to the cover glass based on the plurality of stain signals.

Some embodiments further comprise an array of sensing elements arranged to output a plurality of sense signals that indicate a location on the cover glass of one or more touches; wherein the force processing module is further configured to calculate a force applied to the cover glass at each touch location based on the strain signals and the sense signals.

In some embodiments, the force processing module calculates the force applied at two or more touch locations by first calculating a centroid of a total force applied and then calculating the force applied at each touch location based on the centroid of the total force and the location of each touch as indicated by the sense signals.

Some embodiments further comprise a cover glass support member fixedly connected to the frame and in supportive contact with the cover, the plurality of strain probes being associated with the support member.

In some embodiments, the cover glass support member comprises an upper support comprising an upper surface in supportive contact with the cover glass; a lower support fixedly connected to the frame; and a bending beam disposed between the upper and lower support, the plurality of strain probes disposed on the bending beam; wherein the movement of the cover glass causes the upper support to move towards the lower support thereby deforming the bending beam, the deformation of the bending beam causing a corresponding change in the output from the strain probes.

In some embodiments, the upper support includes a plurality of pedestals disposed on a lower surface of the upper support, the plurality of pedestals concentrating the force imparted from the cover glass onto discrete areas along the bending beam.

In some embodiments, the cover glass support member further comprises a plurality of flexures, each flexure comprising an upper strain probe disposed on the upper surface of the bending beam; and a lower strain probe disposed on the lower surface the bending beam.

In some embodiments, each pedestal has a first flexure adjacent to a first side of the pedestal and a second flexure adjacent to a second side of the pedestal.

In some embodiments, each pedestal is associated with a wheatstone bridge that interconnects the upper and lower strain probes of the first flexure and the upper and lower strain probes of the second flexure.

In some embodiments, the lower support includes a stop surface that prevents further movement of the cover glass when the lower surface of the bending beam contacts the stop surface.

In some embodiments, the cover glass support member comprises at least one bending beam that is in supportive contact with the cover glass; a plurality of clips, wherein each clip attaches a bending beam end to an interior of the frame, each clip having one of the plurality of strain probes disposed thereon; wherein the movement of the cover glass causes each of the clips to rotate, thereby causing a corresponding change in the output from the strain probes.

In some embodiments, the cover glass further comprises an opaque region located along a perimeter of the cover glass; wherein the plurality of strain probes are located on an interior surface of the cover glass within the opaque region.

Some embodiments further comprise a compressible layer connected on a first side to the interior surface of the cover glass within the opaque region and connected on a second side fixed datum within the interior of the electronic device.

Some embodiments further comprise an elastomeric border connected to the frame and disposed between the cover glass and the frame; and a compressible layer connected on a first side to the interior surface of the cover glass within the opaque region and connected on a second side to the elastomeric border.

Examples of embodiments described herein may take the form of a support member for a cover glass component of an electronic device, comprising an upper support comprising an upper surface adapted to be in supportive contact with the cover glass; a lower support adapted to be fixedly connected to a frame of the electronic device; and a bending beam disposed between the upper and lower support; and a plurality of strain probes disposed on the bending beam; wherein a movement of the cover glass causes the upper support to move towards the lower support thereby deforming the bending beam, the deformation of the bending beam causing a corresponding change in the output from the strain probes.

In some embodiments, the upper support includes a plurality of pedestals disposed on a lower surface of the upper support, the plurality of pedestals concentrating a force imparted from the cover glass onto discrete areas along the bending beam.

Some embodiments further comprise a plurality of flexures, each flexure comprising an upper strain probe disposed on the upper surface of the bending beam; and a lower strain probe disposed on the lower surface the bending beam.

In some embodiments, each pedestal has a first flexure adjacent to a first side of the pedestal and a second flexure adjacent to a second side of the pedestal.

In some embodiments, each pedestal is associated with a wheatstone bridge that interconnects the upper and lower strain probes of the first flexure and the upper and lower strain probes of the second flexure.

In some embodiments, the lower support includes a stop surface that prevents further movement of the cover glass when the lower surface of the bending beam contacts the stop surface.

Examples of embodiments described herein may take the form of a support member for a cover glass component of an electronic device, comprising at least one bending beam adapted to be in supportive contact with the cover glass; a plurality of clips, wherein each clip is adapted to attach a bending beam end to an interior of the frame, each clip having one of the plurality of strain probes disposed thereon; wherein a movement of the cover glass causes each of the clips to rotate, thereby causing a corresponding change in the output from the strain probes.

Examples of embodiments described herein may take the form of a cover glass component of an electronic device, comprising an opaque region located along a perimeter of the cover glass; a plurality of strain probes located on an interior surface of the cover glass within the opaque region.

Some embodiments further comprise a compressible layer connected on a first side to the interior surface of the cover glass within the opaque region and connected on a second side fixed datum within the interior of the electronic device.

Some embodiments further comprise an elastomeric border connected to the frame and disposed between the cover glass and the frame; and a compressible layer connected on a first side to the interior surface of the cover glass within the opaque region and connected on a second side to the elastomeric border.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present disclosure, it is believed that the disclosure will be better understood from the following description taken in conjunction with the accompanying Figures, in which:

DETAILED DESCRIPTION

Figure 1:
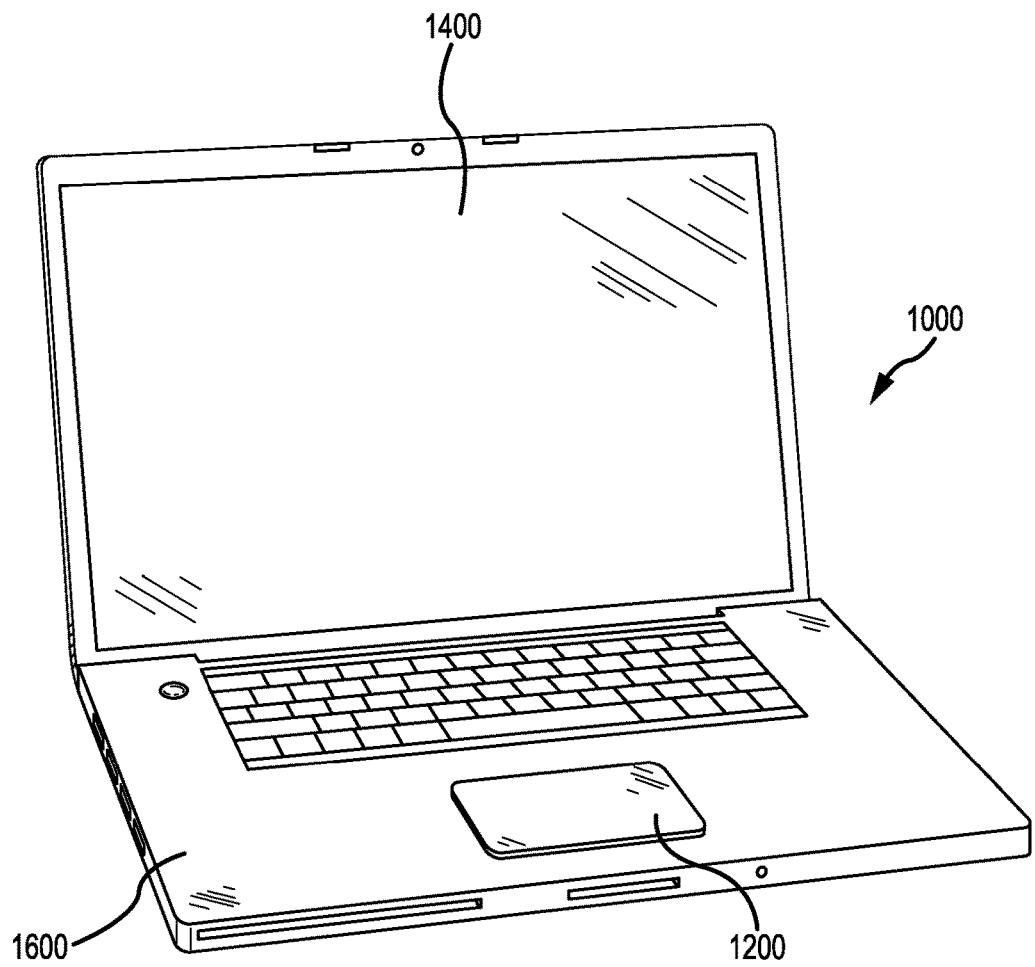
FIG. 1 is a perspective illustration of an electronic device embodiment that includes a force sensor.

The present disclosure is related to a force sensing device that may be incorporated into a variety of electronic or computing devices, such as, but not limited to, computers, smart phones, tablet computers, track pads, and so on. The force sensing device may be used to detect one or more user force inputs on an input surface and then a processor (or processing element) may correlate the sensed inputs into a force measurement and provide those inputs to the computing device. In some embodiments, the force sensing device may be used to determine force inputs to a track pad, a display screen, or other input surface.

The force sensing device may include an input surface that provides an engagement surface for a user, such as the external surface of a track pad or the cover glass for a display. In other words, the input surface may receive one or more user inputs directly or indirectly. The force sensing device includes a force sensor that may be implemented as a strain gauge or other circuit element that is response to forces applied to the input surface. The force sensor is operatively coupled to the input surface such that the force sensor responds when a user presses against the input surface with a finger, thumb, stylus, or other object. The input surface is moveably connected to a body or frame of the electronic device such that the input surface displaces a certain amount when pressed. Movement of the input surface stresses the force sensor or structures associated with the force sensor such that the force sensor outputs a strain signal that is responsive to the applied stress.

The force sensor sensing device may include a plurality of force sensors that are located at various points along the perimeter of the input surface. In one embodiment, the force sensing device includes a number of bending beams that extend along the perimeter of input surface. Force sensors located on the bending beam respond as the bending beam bends in response to forces applied to the input surface. In another embodiment, the force sensing device is movably connected to the input surface through an elastomeric or otherwise compressible member located between the input surface and a device datum or other fixed point within the device Force sensors connected to an interior of the input surface proximate to the edges of the input surface respond as the input surface moves. In still another embodiment, the force sensing device includes a number of bending beams that attach to the body or frame of the electronic device through a number of rotatable clips. Force sensors located on the rotatable clips respond as the bending beam moves the clips in response to forces applied to the input surface.

In some embodiments, the force sensing device may be incorporated into or used in conjunction with a touch sensitive device. In these embodiments, touch inputs detected by the touch device may be used to further refine the force input location, confirm the force input location, and/or correlate the force input to an input location. In the last example, the force sensitive device may not use the capacitive sensing of the force sensing device to estimate a location, which may reduce the processing required for the force sensing device. Additionally, in some embodiments, a touch sensitive device may be used to determine force inputs for a number of different touches. For example, the touch positions and force inputs may be used to estimate the input force at each touch location.

The strain signals output from the sensors are received by the processor, which processes the strain signal to determine an amount of force applied to the input surface. Here, the processor may calculate the forces applied locally at a particular force sensor or group of force sensors, and then sum the locally applied forces to determine a total amount of applied force. The processor may also estimate or otherwise determine a centroid for the applied force on the input surface based on the proportion of the total force applied at each force sensor or group of force sensors. In the event that the user applied the force using one finger or other object, the force centroid may be taken to be the location on the input surface where the force was applied. If the electronic device is a touch sensitive device or otherwise includes a mechanism for separately determining the location of touch inputs, this mechanism may be used in combination with the force sensing device to determine the force applied at each touch location when the user applies the force using more than one finger or other object. Here, force applied at a particular touch location is determined based on the proximity of the touch location to the force centroid.

Electronic Device Embodiments

Figure 2A:
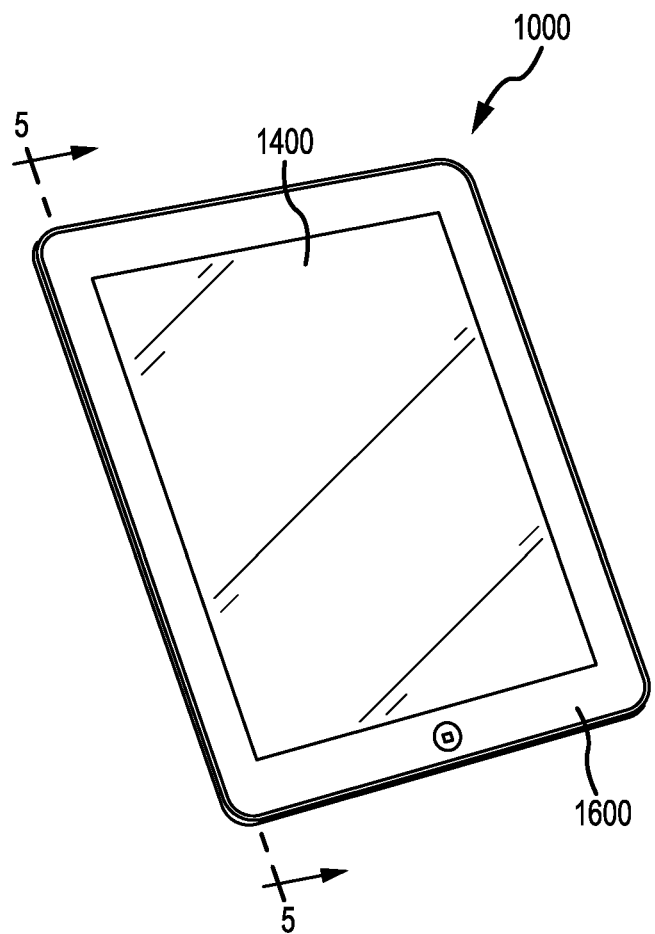
FIG. 2A is a top plan view of another electronic device embodiment that includes a force sensor.
Figure 2B:
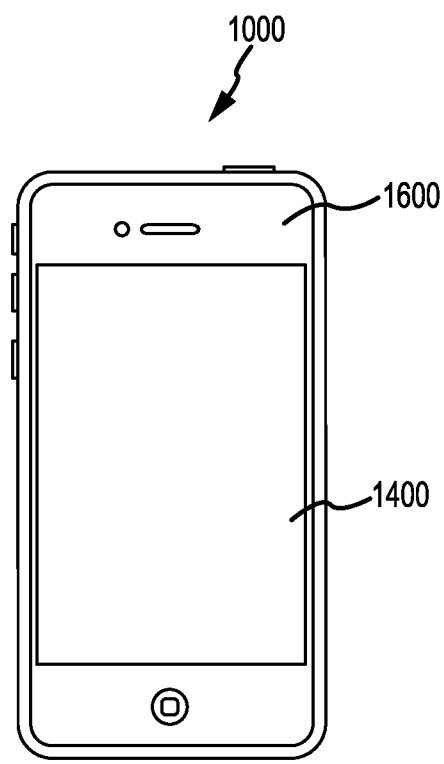
FIG. 2B is a top plan view of still another electronic device embodiment that includes a force sensor.

Turning now to the figures, illustrative electronic devices that may incorporate the force sensing device will be discussed in more detail. FIGS. 1, 2A, and 2B illustrate various computing or electronic devices that may incorporate the force sensing device. With reference to FIG. 1, the force sensing device may be incorporated into a computer 1000, such as a laptop or desktop computer. The computer 1000 may include a track pad 1200 or other input surface, a display 1400, and an enclosure 1600 or frame. The enclosure 1600 may extend around a portion of the track pad 1200 and/or display 1400. In the embodiment illustrated in FIG. 1, the force sensing device may be incorporated into the track pad 1200, the display 1400, or both the track pad 1200 and the display 1400. In these embodiments, the force sensing device may be configured to detect force inputs to the track pad 1200 and/or the display 1400.

In some embodiments, the force sensing device may be incorporated into a tablet computer. FIG. 2A is a top perspective view of a tablet computer including the force sensing device. With reference to FIG. 2A, the table computer 1000 may include the display 1400 where the force sensing device is configured to detect force inputs to the display 1400. In addition to the force sensing device, the display 1400 may also include one or more touch sensors, such as a multi-touch capacitive grid, or the like. In these embodiments, the display 1400 may detect both force inputs, as well as position or touch inputs.

In yet other embodiments, the force sensing device may be incorporated into a mobile computing device, such as a smart phone. FIG. 2B is a perspective view of a smart phone including the force sensing device. With reference to FIG. 2B, the smart phone 1000 may include a display 1400 and a frame or enclosure 1600 substantially surrounding a perimeter of the display 1400. In the embodiment illustrated in FIG. 2B, the force sensing device may be incorporated into the display 1400. Similarly to the embodiment illustrated in FIG. 2A, in instances where the force sensing device may be incorporated into the display 1400, the display 1400 may also include one or more position or touch sensing devices in addition to the force sensing device.

Force Sensor Embodiments

Figure 3:
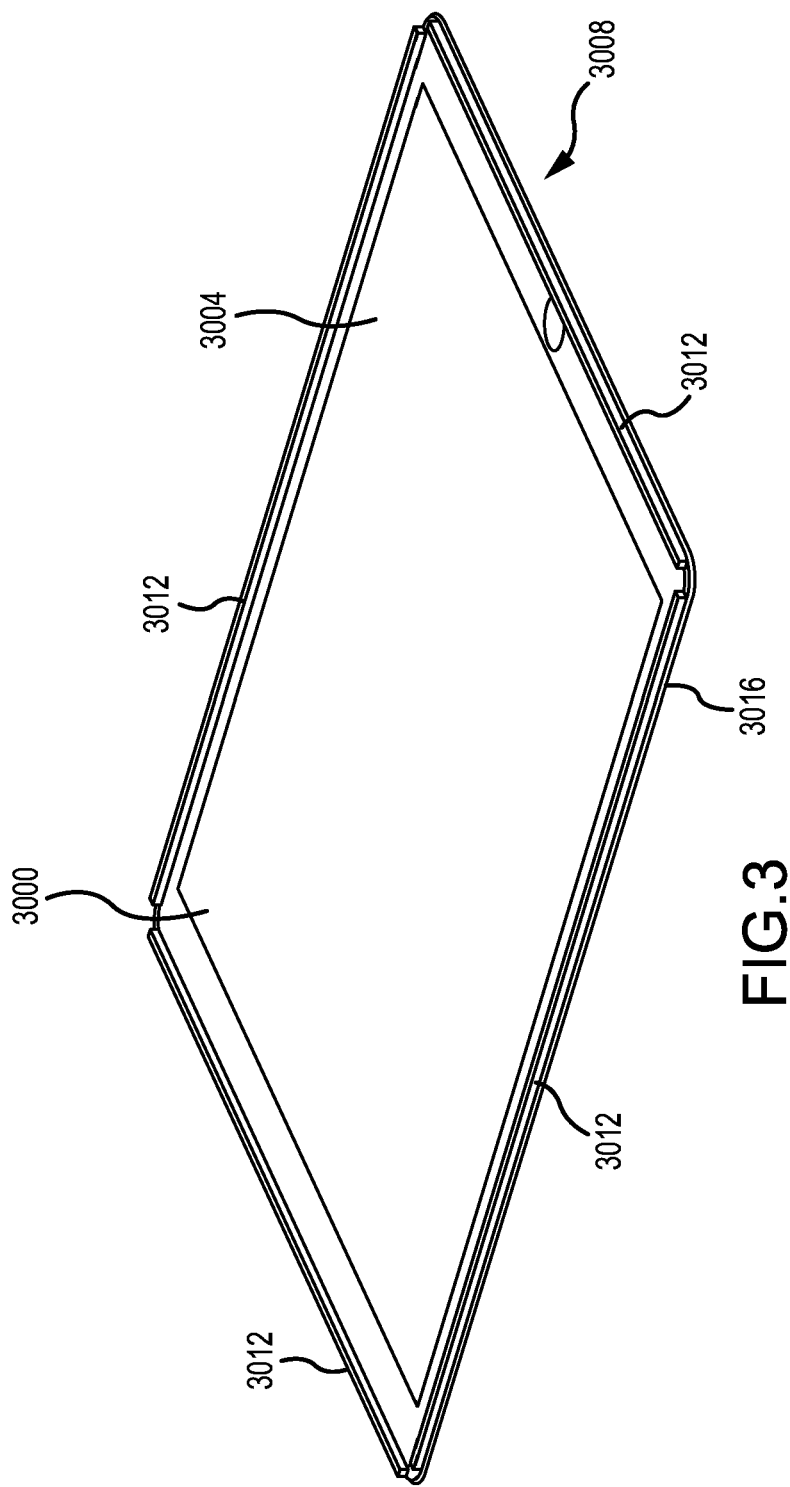
FIG. 3 is a schematic illustration of a cover glass in accordance with embodiments discussed herein.

Turning now to example force sensors, reference is made to FIG. 3 which is a schematic illustration of a cover glass 3000 for the electronic device shown in FIG. 2A. The following force sensor discussion references the electronic device shown in FIG. 2A by way of example and not limitation. The various force sensors discussed herein may be incorporated in other electronic devices depending upon the application. The cover glass 3000 has an interior facing surface 3004 and an exterior facing surface 3008. The cover glass 3000 shown in FIG. 3 is oriented such that the interior facing surface 3004 is shown in the figure. When incorporated in an electronic device 1000, the cover glass 3000 is connected to a frame or other enclosure such that the frame and cover glass 3000 enclose an interior space of the electronic device 1000. A user may enter inputs into the electronic device through forceful touches on the exterior surface 3008 of the cover glass 3000. Circuits adapted to be responsive to the forceful touch input are disposed proximate to the underside or interior facing surface 3004 of the cover glass 3000.

As shown in FIG. 3, the cover glass 3000 may include a number of beams 3012 disposed along a perimeter 3016 of the cover glass 3000. The beams 3012 are attached to the interior facing surface 3004 of the cover glass 3000. In accordance with embodiments discussed herein, the beams 3012 function to both support the weight of the cover glass 3000 and to provide a mounting or other location for a number of strain probes that are configured to measure a force applied to the exterior surface 3008 of the cover glass 3000.

Figure 4:
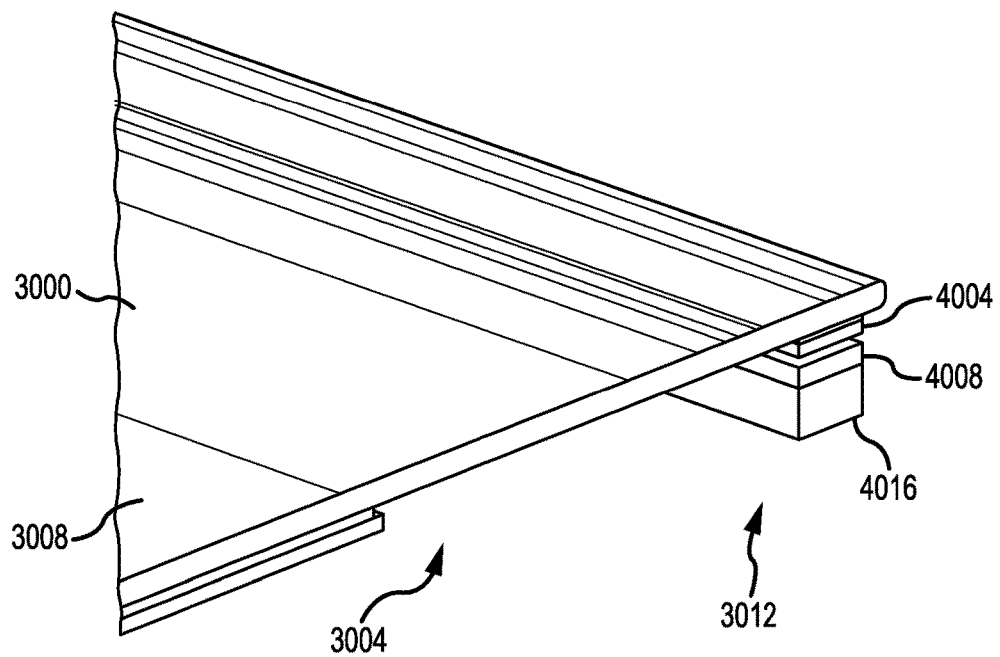
FIG. 4 is a cut-away illustration of the cover glass embodiment shown in FIG. 3.

The construction of a beam 3012 in accordance with embodiments discussed herein may be seen in more detail in FIG. 4. FIG. 4 is a cut-away illustration of the cover glass 3000 embodiment shown in FIG. 3. In FIG. 4, the exterior facing surface 3008 of the cover glass 3000 is facing upward, and the interior facing surface 3004 of a cover glass 3000 is facing downward. As can be seen in FIG. 4, the beam 3012 includes an upper support 4004 that is attached to the interior facing surface 3004 of the cover glass 3000. The beam 3012 additionally includes a lower support 4016 that is attached to the frame of the electronic device 1000. The beam 3012 additionally includes a bending beam 4008 disposed between the upper support 4004 and the lower support 4016. The beam 3012 includes a number of interior spaces which allow the upper support 4004 to move towards the interior of the electronic device 1000 when a force is applied to the exterior surface 3008 of the cover glass 3000. Said another way, when a user applies a force by, for example, pressing with a finger on the exterior surface 3008 of the cover glass 3000, the beam 3012 compresses such that the upper support 4004 moves towards the lower support 4016. Because the lower support 4016 is rigidly or fixedly attached to the frame of the electronic device 1000, the cover glass 3000 moves with respect to the frame when the force is applied.

Figure 5:
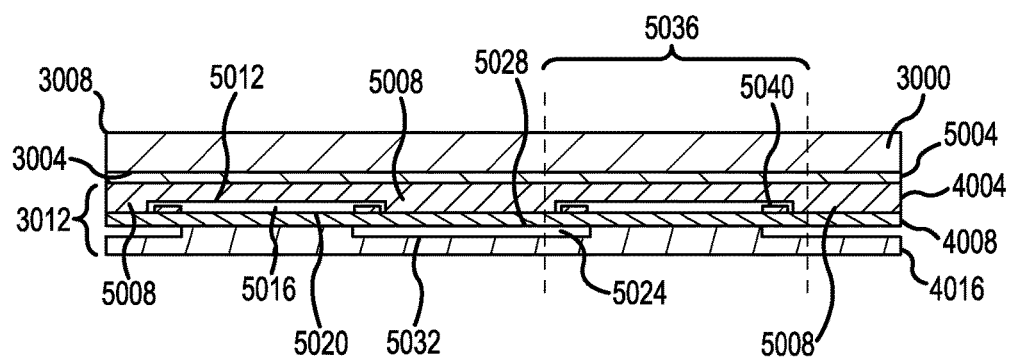
FIG. 5 is perspective illustration of an embodiment of the beam and cover glass construct shown in FIG. 4.
Figure 6:
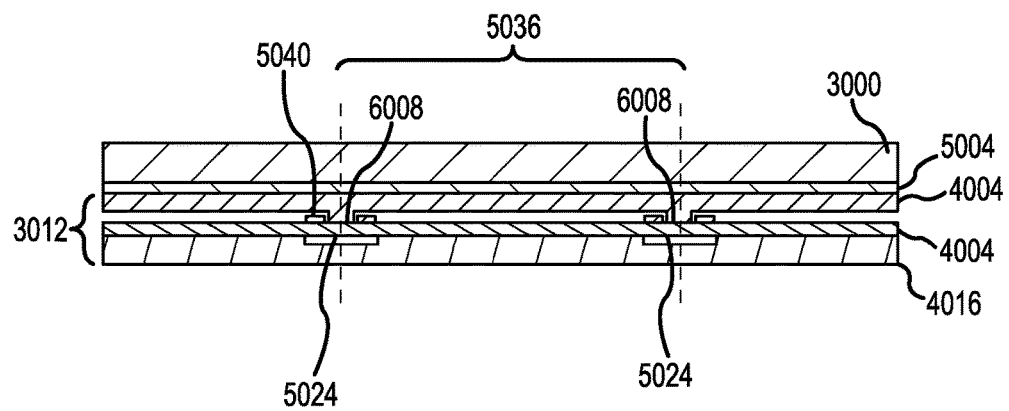
FIG. 6 is perspective illustration of an alternative embodiment of the beam and cover glass construct shown in FIG. 4.

FIG. 5 and FIG. 6 are cross sectional illustrations of the beam and cover glass construct shown in FIG. 4. The location of the cross section of FIG. 5 and FIG. 6 is indicated in FIG. 3 as cross section 5. Turning first to FIG. 5, the cross sectional view of this figure shows the cover glass 3000 attached to the beam 3012 at the interior surface 3004 of the cover glass 3000. As can be seen in FIG. 5, a layer of adhesive 5004 may be used to attach the cover glass 3000 to the beam 3012. As can be further seen in FIG. 5, the beam 3012 includes an upper support 4004, a bending beam 4008, and a lower support 4016. As can be seen in FIG. 5, the upper support 4004 may include a number of pedestals 5008, or such pedestals may be separately formed and adjacent or attached to the upper support. Each pedestal 5008 is typically disposed on the interior facing surface 5012 of the upper support 4004. The pedestal 5008 extends downwardly from the interior facing surface 5012 to contact an upward facing surface of the bending beam 4008. The pedestal 5008 functions to concentrate the force or forces applied to the exterior surface 3008 of the cover glass 3000 onto specific areas of the bending beam 4008. The pedestal 5008 additionally forms interior spaces 5016 between the upper support 4004 and the bending beam 4008. As can be seen in FIG. 5, the interior spaces 5016 are located between the lower surface 5012 of the upper support 4004 and the upper surface 5020 of the bending beam 4008.

Due to the presence of the pedestals 5008, the bending beam 4008 will flex downward in response to an applied force at the locations of the pedestals 5008. In this regard, the lower support 4016 may include a number of interior spaces 5024 which allow the bending beam 4008 to flex in response to an applied force. As can be seen in FIG. 5, the lower support 4016 contains a number of interior spaces 5024 disposed between a lower or interior surface 5028 of the bending beam 4008 and an upper surface 5032 of the lower support 4016. Because the lower support 4016 is rigidly connected to the frame, the surface 5032 provides a stopping surface for the bending beam 4008. It should be appreciated that the orientation of the stopping surface 5032 shown in FIG. 5 is by a way of example and not limitation. In accordance with alternative embodiments the stopping surface 5032 may be a raised or otherwise removed from the exterior or upwardly facing surface to provide an upwardly facing pedestal which engages the bending beam 4008 when a force is applied to the cover glass 3000.

The width of the pedestals 5008 shown in FIG. 5 is by way of example and not limitation. The pedestals 5008 shown in FIG. 5 are relatively wide. In accordance with alternative embodiments, the upper support 4004 may include relatively narrow pedestals 6008, such as in the alternative construction illustrated in FIG. 6. The narrow pedestal 6008 shown in FIG. 6 may function similarly to the wide pedestal shown in FIG. 5. Specifically, the pedestal 6008 may function to concentrate force applied to the exterior surface of the cover glass 3000 to specific points along the bending beam 4008.

As can be seen in FIGS. 5 and 6, the bending beam 3012 includes a number of flexures 5036. Each flexure is adjacent to at least one pedestal 5008 and may be disposed between two pedestals 5008. Each pedestal 5008 is thus typically disposed between two flexures 5036, one on each side of the pedestal 5008. The flexure 5036 includes at least one strain probe 5040, which is adapted to measure a strain as the bending beam 4008 flexes with an applied force. As can be seen in FIGS. 5 and 6, the flexure 5036 includes portions of the interior spaces 5016 and 5024. In this regard, the flexure 5036 is provided with room through which the flexure 5036 may move to register an amount of bending in the bending beam 4008 that occurs in response to an applied force.

Figure 7:
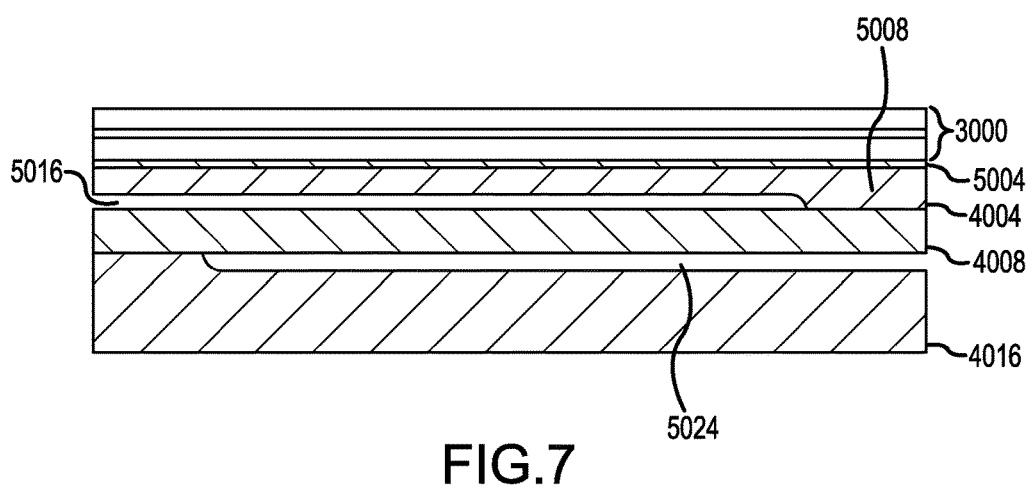
FIG. 7 is an enlarged cross-sectional view of a flexure shown in FIG. 5.

FIG. 7 is an enlarged cross-sectional view of a portion of an individual flexure 5036, which may be suitable for use in the structure shown in FIG. 5 or FIG. 6. As can be seen in FIG. 7, the flexure portion is adjacent to the pedestal 5008. The flexure portion includes interior spaces 5016 and 5024 which allow for bending of the bending beam 4008 at the flexure 5036. In accordance with the embodiments discussed herein, the flexure 5036 provides a mounting area for one or more strain probes. As can be seen in FIGS. 5 and 6, the strain probes may be disposed on the upward facing surface of the bending beam 4008. However, this configuration is by way of example and not limitation. In accordance with other embodiments the strain probes are incorporated into the interior of the bending beam 4008. Such an embodiment is illustrated schematically in FIG. 8.

Figure 8:
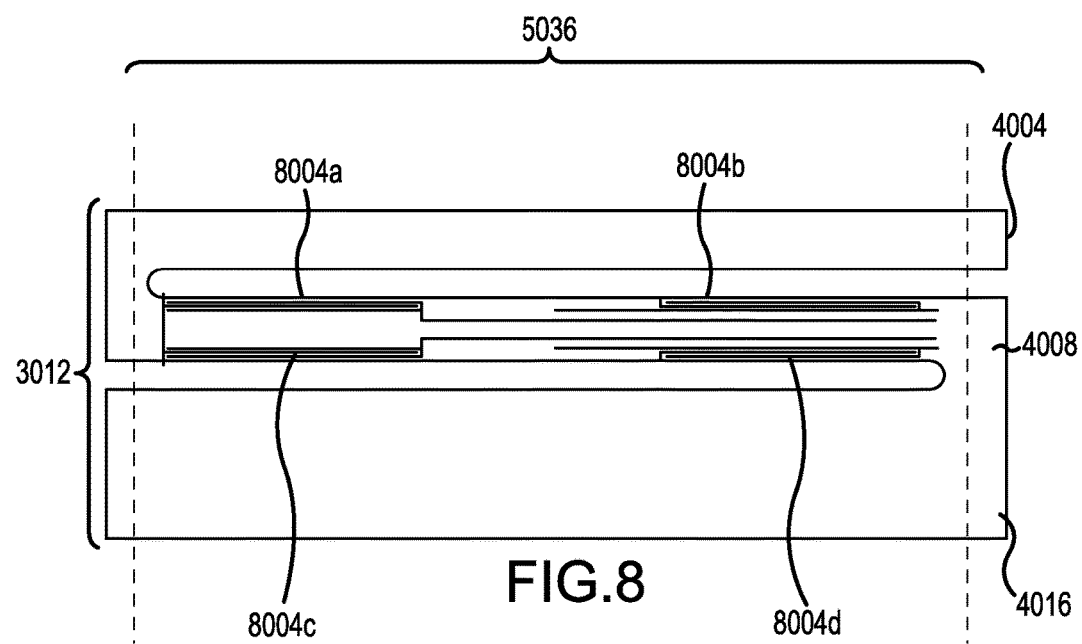
FIG. 8 is schematic illustration of a beam having a number of strain probes incorporated into the bending beam portion of the beam.
Figure 9:
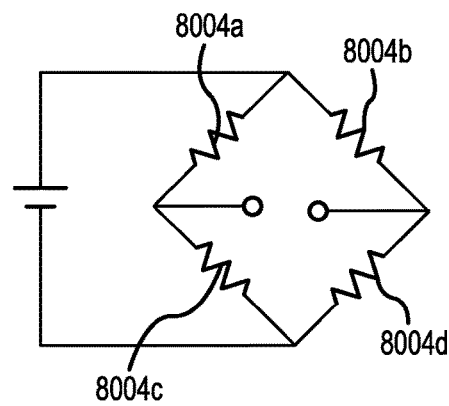
FIG. 9 is circuit diagram showing the interconnections among the strain probes shown in FIG. 8.

FIG. 8 is a schematic illustration of an individual flexure 5036, which may be suitable for use in the structure shown in FIG. 5 or FIG. 6. As can be seen in FIG. 8, the bending beam 4008 may include four strain probes 8004*a-d*. In this arrangement two strain probes 8004*a, b* are located approximate to the upper surface of the bending beam 4008. Similarly, the bending beam 4008 includes two strain probes 8004*c, d* disposed proximate to the lower surface of the bending beam 4008. In accordance with embodiments discussed herein, the strain probes 8004*a-d* may be arranged in a Wheatstone bridge configuration shown in FIG. 9. It should be appreciated that the arrangement of strain gauges and circuit shown in the figures is by way of example and not limitation. Certain embodiment within the scope of this disclosure may have greater or fewer strain gauges and differing circuits for receiving strain gauge output, depending on the application.

Figure 10:
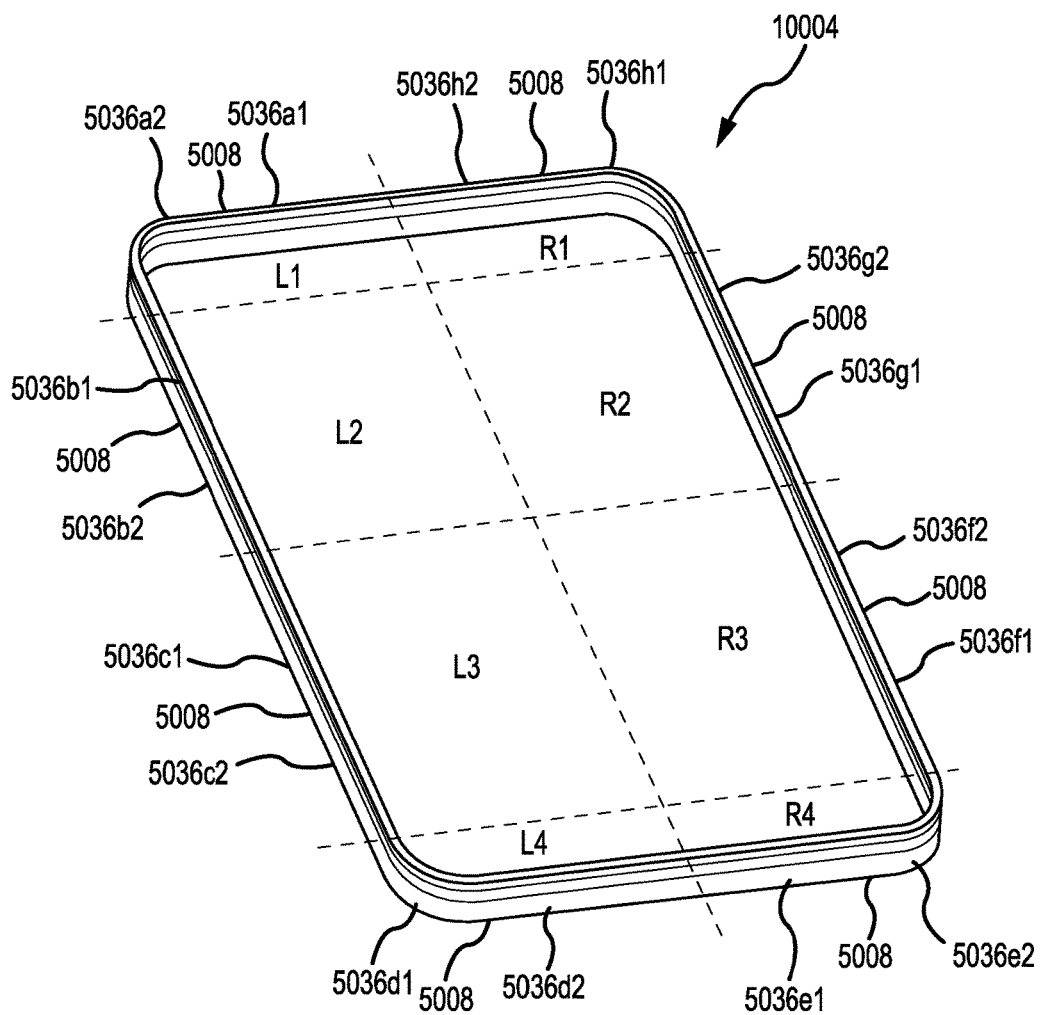
FIG. 10 is a perspective illustration of frame for the cover glass shown in FIG. 3.

As discussed above, the beam 3012 may be attached to a frame which encloses an interior of the electronic device 1000. Such a frame is illustrated in FIG. 10 and generally is identified with reference numeral 10004. FIG. 10 additionally includes the location for a number of pedestals 5008 and flexures 5036*a1-h2* in accordance with an embodiment discussed herein. As shown in FIG. 10, this arrangement organizes the exterior surface of the electronic device 1000 into eight regions, each region containing one pedestal and two flexures. The left side of the electronic device 1000 includes four regions L1-L4. Regions L1 and L4 are smaller and located proximate to the corners of the electronic device 1000. Similarly the right side of the electronic device 1000 includes four sections R1-R4, with sections R1 and R4 being smaller and located near the corners of the device.

The orientation of pedestals 5008, flexures 5036*a1-h2* and the associated sections shown in FIG. 10 is by way of example and not limitation. In other embodiments, the strain gauges and/or pedestals 5008 may be located at the corners of the device. In still other embodiments, the strain gauges and/or pedestals 5008 are located beneath the display stack instead of or in addition to being located around the perimeter of the device. The arrangement of strain gauges and/or pedestals 5008 need not be symmetrical or have the same number of gauges on opposing sides. In addition, the corners of the cover glass 3000 or the beam 3012 supporting the cover glass 3000 may be attached to the frame 10004 at the corners of the device. This attachment may be through bolting the beam to frame 10004, making the beam 3012 part of the frame 10004 or attaching the beam 100004 or the cover glass 3000 itself to the frame 100004 with VHB or similar adhesive. The cover glass 3000 near and directly above these attachment points may be relatively insensitive to applied force; however, the use of bending flexures 5036 as described in FIG. 10 will allow force to be detected and measured at all other parts of the cover glass 3000.

Figure 11A:
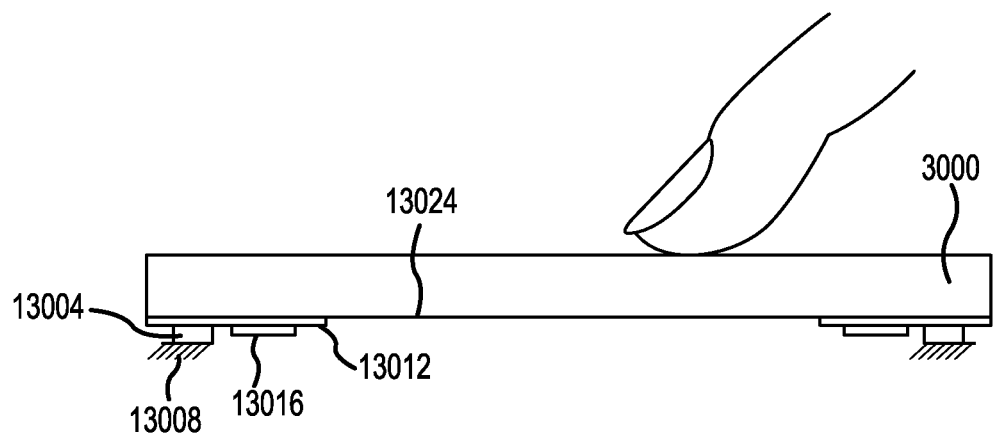
FIG. 11A is a schematic illustration of cover glass embodiment having a moveable attachment to a device datum or other fixed position within a touch I/O device.
Figure 11B:
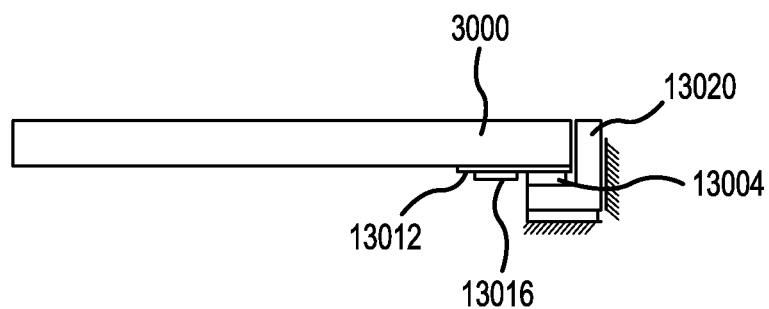
FIG. 11B is a schematic illustration of cover glass embodiment having a moveable attachment to an elastomeric member that provides a seat or other border between the frame and the cover glass of a touch I/O device.

FIGS. 11A and 11B illustrate another force sensor in accordance with embodiments discussed herein. FIG. 11A shows the cover glass 3000 having a moveable attachment to a device datum or other fixed position 1308. The cover glass 3000 is attached to a compressible or elastomeric member 13004 between the cover glass 3000 and the datum 13008. The cover glass 3000 additionally includes a black mask area 13012. Generally, the black mask area 13012 covers circuitry or other components contained within the interior of the electronic device and located near a border region of the cover glass 3000. The black mask area 13012 provides a border for a transparent area 13024, which is adapted to receive touch input and to display a graphical user interface or other visible icons on the surface of the cover glass 3000. As can be seen in FIG. 11A, the embodiment additionally includes a strain gauge 13016 disposed on the underside of the cover glass 3000 in the black mask area 13016.

The embodiment shown in FIG. 11A has a cover glass 3000 with an edge that substantially corresponds to the edge of the electronic device 1000. In accordance with alternative embodiments, the electronic device 1000 may include a rubber or other elastomeric member 13020 which provides a seat or other border between the frame and the cover glass 3000. This configuration is illustrated in FIG. 11B and the elastomeric border is generally identified with reference numeral 13020. As can be seen in FIG. 11B, the embodiment additionally includes a compressible or other elastomeric member 13004 between the cover glass 3000 and the border member 13020. As can be seen in FIG. 11B, the embodiment additionally includes a strain probe or strain gauge 13016 disposed on the underside of the cover glass 3000 in the black mask area 13012. As the user applies a force to the exterior surface of the cover glass 3000, the strain gauge 13016 located in the black mask area 13012 is thereby actuated. In some instances, it may be beneficial to sense the strain difference between two points in the black mask 13012 so two strain sensors 13016 may be placed so they detect the strain difference. Moreover, it may be beneficial to detect the strain both perpendicular and parallel to the boundary so it may be useful to use two strain gages 13016, one oriented perpendicular to the boundary and one oriented parallel to the boundary.

Figure 12A:
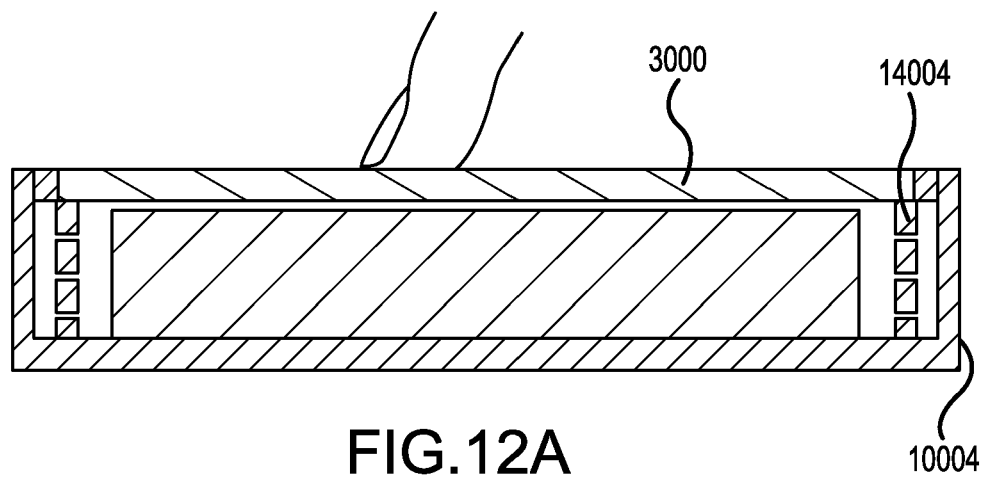
FIGS. 12A-12D illustrate an alternative embodiment of a cover glass and cover glass support in accordance with embodiments discussed herein.
Figure 12B:
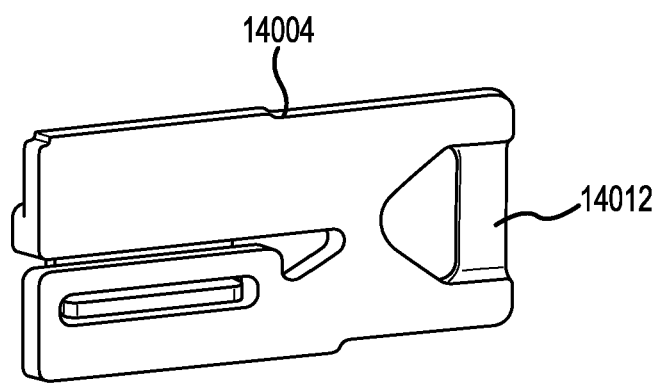
Figure 12C:
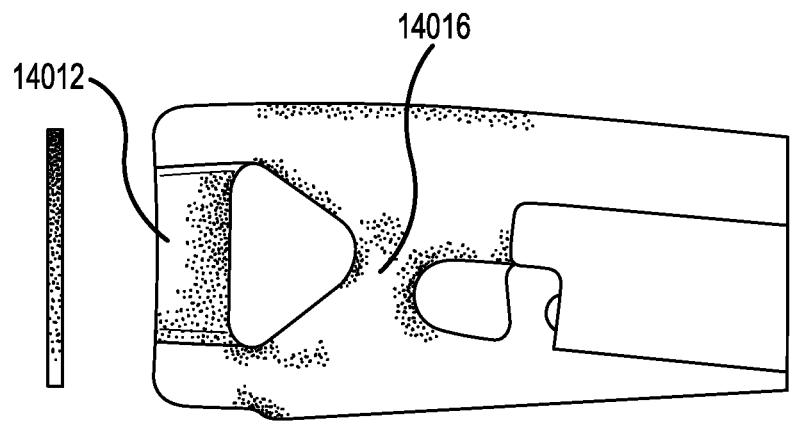
Figure 12D:
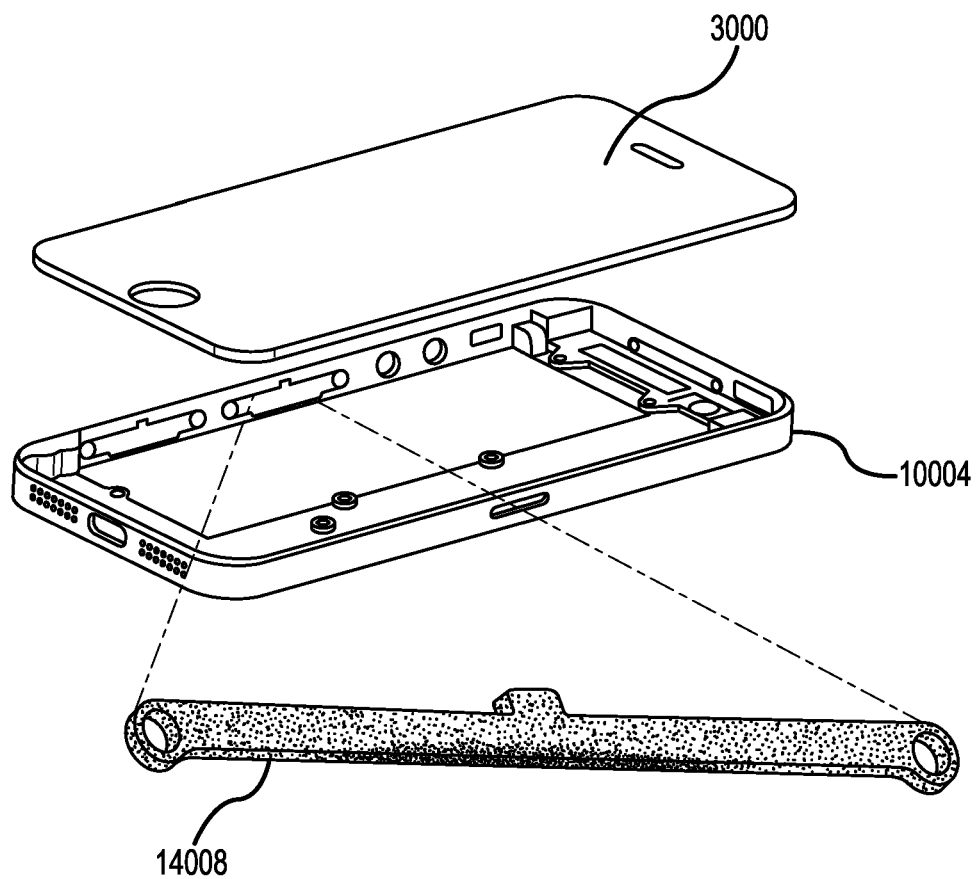

FIG. 12A illustrates another strain based force sensing approach in accordance with embodiments discussed herein. The following force sensor discussion references the electronic device shown in FIG. 2B by way of example and not limitation. The force sensors shown in FIGS. 12A-12D may be incorporated in other electronic devices depending upon the application. As can be seen in FIG. 12A, the embodiment may include a clip or a number of clips 14004 which are rigidly attached to the frame 10004. As an example, a clip (14004) is shown in greater detail in FIG. 12B. As seen in FIG. 12B, the clip 14004 includes a strain gauge 14012 oriented in a vertical direction. The top surface of the clip 14004 is rigidly attached to the cover glass 3000, and the bottom surface of the clip is rigidly attached to the frame. When the user applies a force to the cover glass 3000, the force exerts a downward pressure deforming the clip by causing a rotation around the pivot 14016 and generating strain on 14012, which would then be measured using the strain gage 14012. Another example of strain sensing following the approach in FIG. 12A is shown in FIG. 12D. In this example, a bending beam, which can be seen in greater detail in FIG. 12D, is used to detect deflection. The beam is rigidly connected to the frame at two mounting holes on both ends as shown in FIG. 12D. The cover glass 3000 is pushing on the beam on the post in the center of the beam. When the user applies a force to the cover glass 3000, this force exerts a downward pressure on the bending beam which, in turn, causes the clip 14004 to rotate about a fixed point 14016. This rotation of the clip 14004 actuates the strain gauge 14012 causing the strain gauge to measure a strain that occurs due to the movement of the cover glass 3000.

Force Sensing Methods

Figure 14:
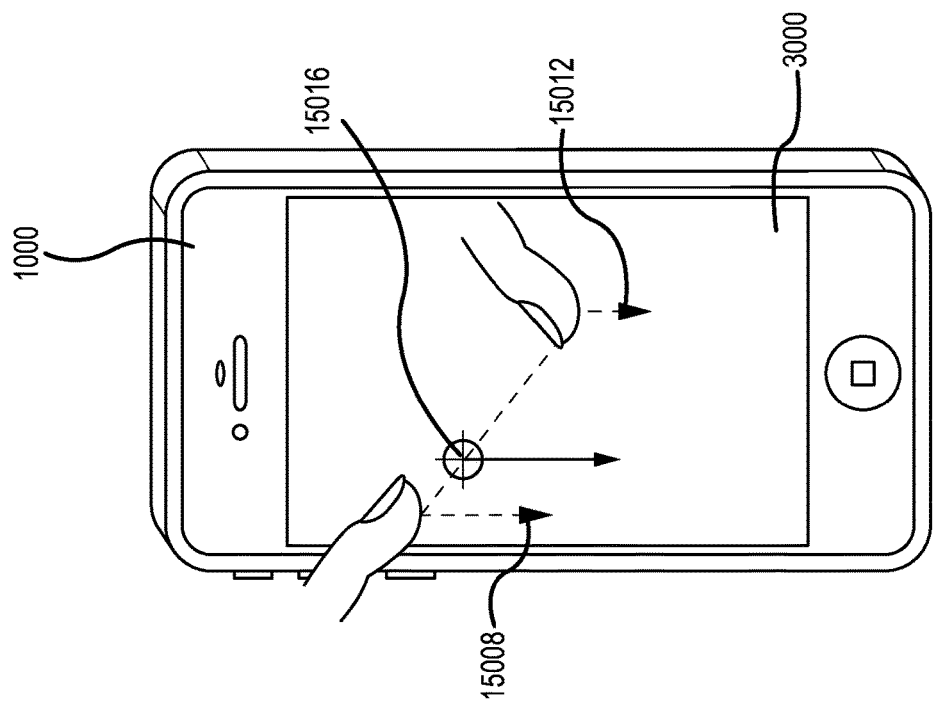
FIG. 14 is a schematic illustration of a user applying multiple forces to a cover glass by pressing downward with more than one finger.
Figure 13:
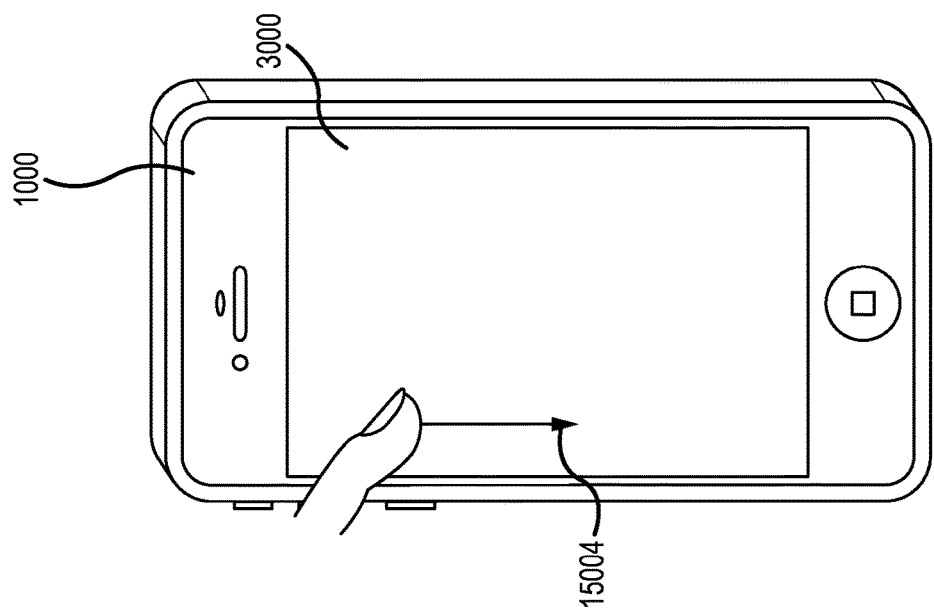
FIG. 13 is a schematic illustration of a user applying a single force to a cover glass by pressing downward with one finger.

FIGS. 13 and 14 illustrate force inputs that may be measured in accordance with embodiments discussed herein. In some instances, force sensor embodiments may be used to measure the force applied by a single touch. Specifically, as can be seen in FIG. 13, a user may apply a single force to the cover glass 3000 by pressing downward with one finger. Here, the strain probes arranged around the perimeter of the cover glass 3000 measure the force applied. In other instances, the user may press downward with more than one finger. For example, as shown in FIG. 14, a first force 15008 and second force 15012 are applied to the cover glass 3000. In response to this multi-force touch input, the system may first determine a centroid 15016 for the combined force. Specifically, the strain probes arranged around the perimeter of the cover glass may calculate the centroid or the location and amount of the centroid through measurements along the perimeter. Following this, the touch I/O system may establish the points on the cover glass for the individual touch inputs. Following this, the system may calculate the force of each touch input based on the location of the touch input and based on the location and amounts of the force input centroid 15016. Methods for measuring applied forces and the locations of applied forces are discussed in greater detail below. Certain portions of the following discussion reference the force sensor shown in FIG. 3 by way of example and not limitation. It should be appreciated that the methods discussed below can be generally applied to the various sensor mechanisms discussed herein.

Figure 15:
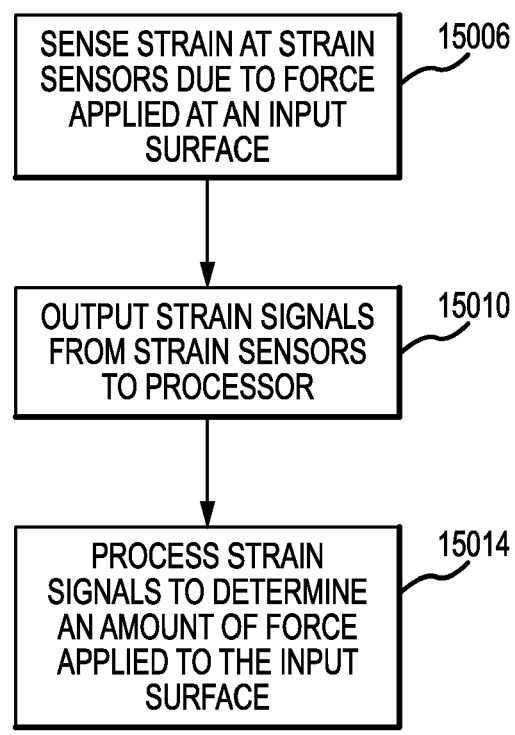
FIG. 15 is a flow chart that illustrates a method embodiment directed to determining an amount of force applied to an electronic device through a input surface.

FIG. 15 is a flow chart that illustrates a method embodiment directed to determining an amount of force applied to an electronic device 1000 through an input surface. Initially, in operation 15006, the electronic device 1000 senses strain through the operation of strain sensors that are responsive to a force applied to an input surface of the electronic device 1000. Operation 15010 occurs flowing operation 15006. In operation 15010, the strain sensors output strain signals, which are received as input to a processor, controller, or other computational element. Operation 15016 occurs flowing operation 15010. In operation 15016, the processor processes the strain signals to determine an amount of force applied to the input surface of the electronic device 1000.

Figure 16:
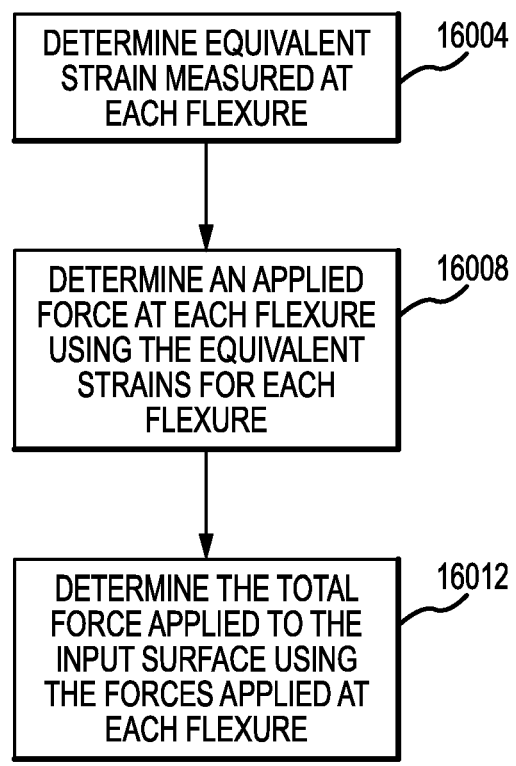
FIG. 16 is a flow chart that illustrates a method embodiment directed performing the processing operation of FIG. 15.

FIG. 16 is a flow chart that illustrates a method embodiment directed to performing the processing operation of FIG. 15. Initially, in operation 16004, the processor determines an equivalent strain for each flexure. For the flexure arraignment shown in FIG. 8 and having the Wheatstone bridge connection shown in FIG. 9, the equivalent strain may be calculated according to the following equation:

$$\text{Equivalent Strain} = 0.5 * (S1 - S2 - S3 + S4) \quad (1)$$

Figure 17:
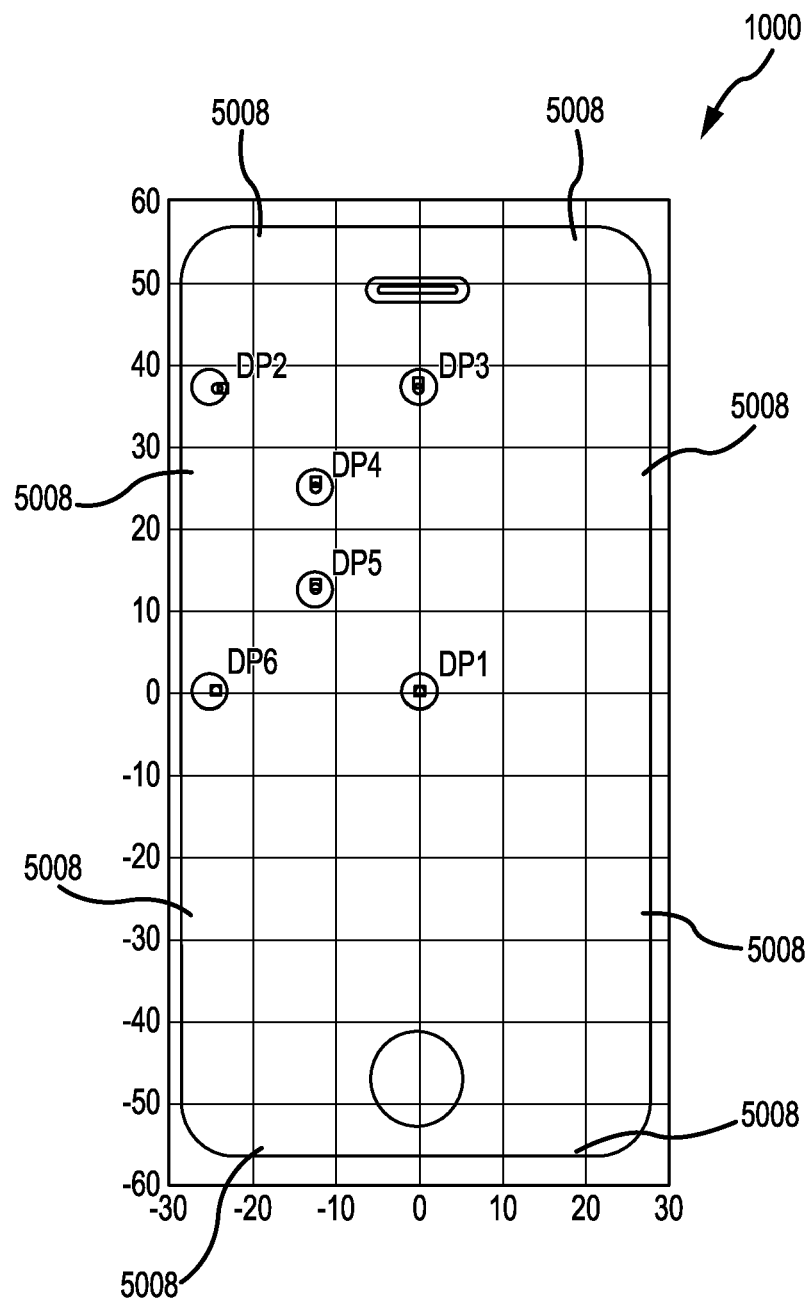
FIG. 17 is a top plan view of the electronic device of FIG. 2A that shows a number of forceful touches to the input surface.
Figure 18:
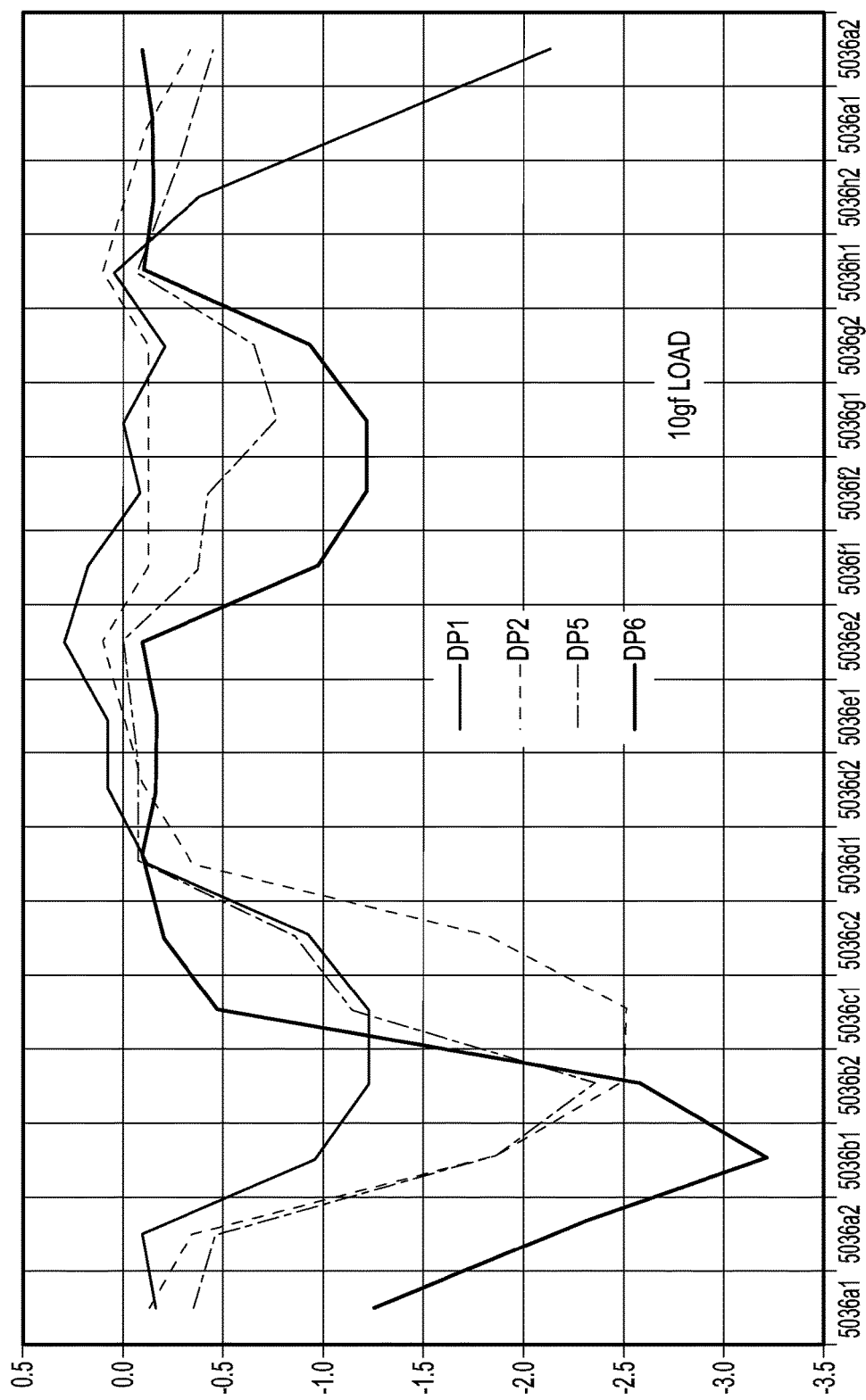
FIG. 18 is chart showing force amounts measured at the individual flexures shown in FIG. 10 for a number of the forceful touches of FIG. 17.

Operation 16008 occurs flowing operation 16004. In operation 16008, the processor determines an amount of applied force at each flexure using the equivalent strains for each flexure. Here, the processor may apply a scaling factor that translates equivalent strain into applied force. The scaling factor may be an empirically derived quantity that is found to most closely convert the equivalent strain to the correct applied force for a number of locations on the input surface. For example, a scaling factor of 2.4 µstrain/gm was derived using the data points illustrated in FIG. 17, which is a top plan view of the electronic device of FIG. 2A. FIG. 17 shows a number of forceful touches, labeled as DP1, DP2, DP3, DP4, DP5 and DP6, to the input surface. Each touch occurred over the area of the force circle near each label. The centroid derived from the raw strain gage data is shown as the small square inside each force circle. Each touch illustrated represents a 10 gf load. Applying the 2.4 µstrain/gm scaling factor to strain data produced by the loads gave the applied for data shown in FIG. 18, which is chart showing force amounts measured at the individual flexures shown in FIG. 10 for a number of the forceful touches of FIG. 17. The specific data points described above are merely examples and the particular scaling factor used in particular case will vary depending on the application according to such conditions are electronic device type, anticipated load amounts, cover glass or touch pad construction, and so.

Operation 16012 occurs flowing operation 16008. In operation 16012, the processor determines the total force applied to the input surface using the forces applied at each flexure. More specifically, the processor sums the individual applied forces to arrive at total force amount that is applied to the input surface.

Figure 19:
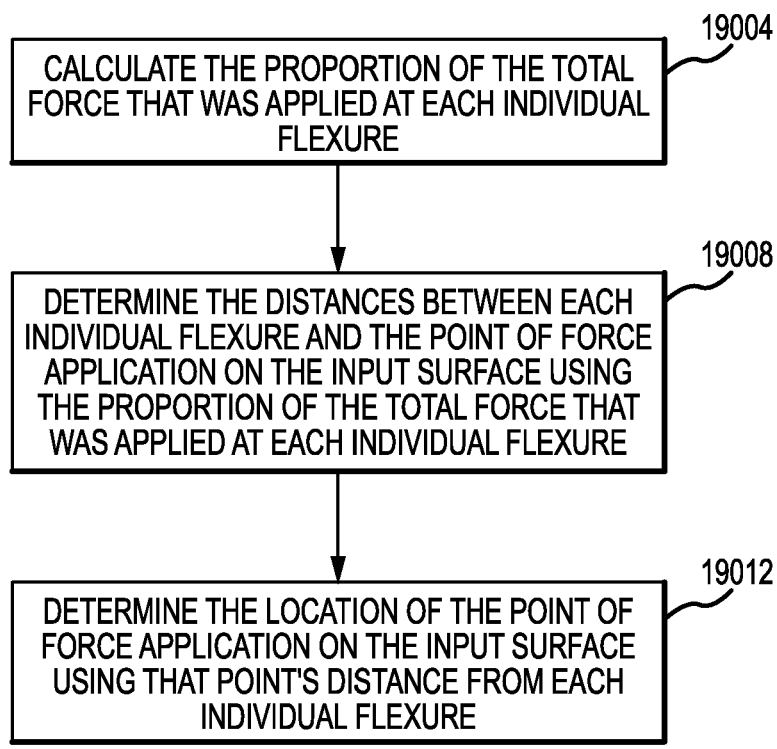
FIG. 19 is a flow chart showing a method embodiment directed to determining a location of single force applied to an input surface.

FIG. 19 is a flow chart showing a method embodiment directed to determining a location of single force applied to an input surface. In operation 19004, the processor calculates the proportion of the total force that was applied at each individual flexure. Operation 19008 occurs flowing operation 19004. In operation 19008, the processor determines the distances between each individual flexure and the point of force application on the input surface using the proportion of the total force that was applied at each individual flexure. Operation 19012 occurs flowing operation 19008. In operation 19012, the processor determines the location of the point of force application on the input surface using that point's distance from each individual flexure.

Figure 20:
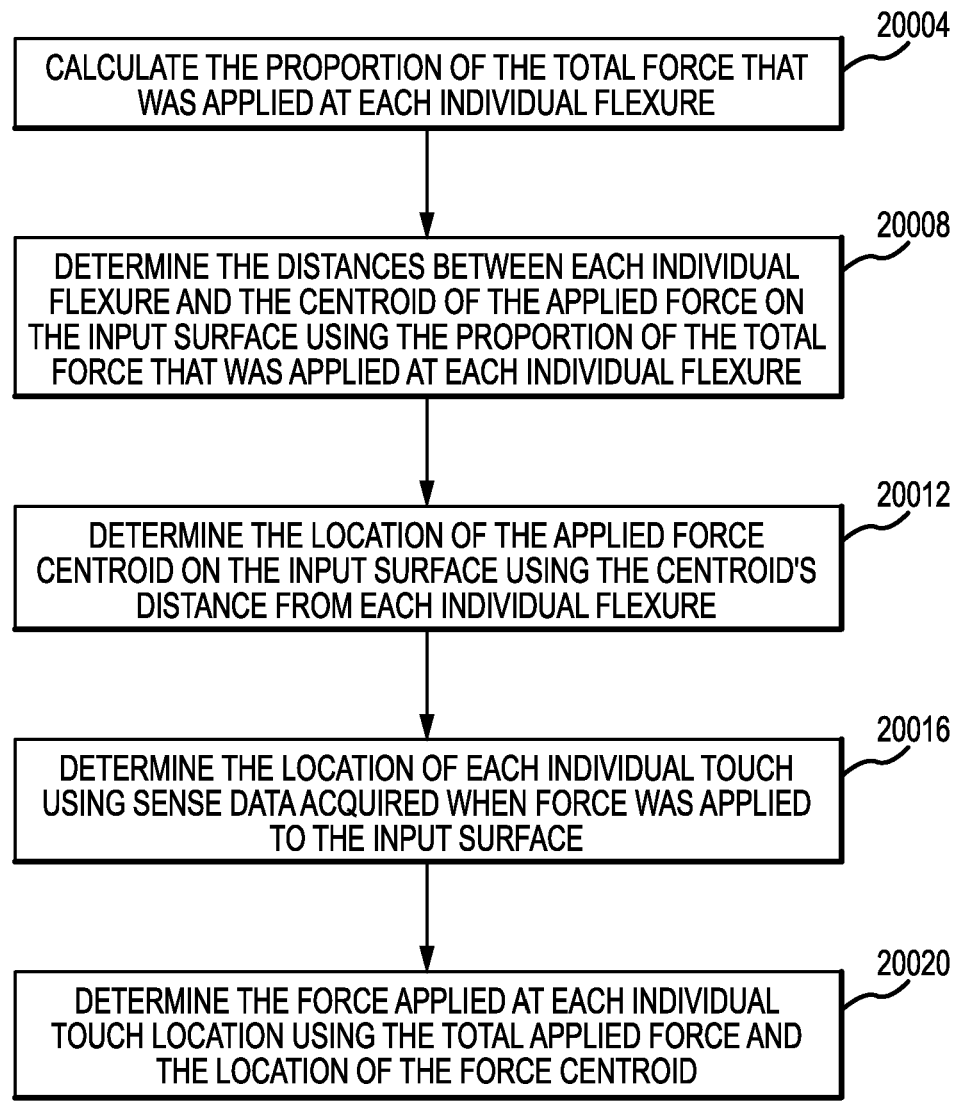
FIG. 20 is a flow chart showing a method embodiment directed to determining the locations of multiple forces applied to an input surface.

FIG. 20 is a flow chart showing a method embodiment directed to determining the locations of multiple forces applied to an input surface. In operation 20004, the processor calculates the proportion of the total force that was applied at each individual flexure. Operation 20008 occurs flowing operation 20004. In operation 20008, the processor determines the distances between each individual flexure and the centroid of the applied force on the input surface using the proportion of the total force that was applied at each individual flexure. Operation 20012 occurs flowing operation 20008. In operation 20012, the processor determines the location of the applied force centroid on the input surface using the centroid's distance from each individual flexure. Operation 200016 occurs flowing operation 20012. In operation 20016, the processor determines the location of each individual touch using sense data acquired when force was applied to the input surface. Operation 20020 occurs flowing operation 20016. In operation 20020, the processor determines the force applied at each individual touch location using the total applied force and the location of the force centroid.

Example System Architecture

Figure 21:
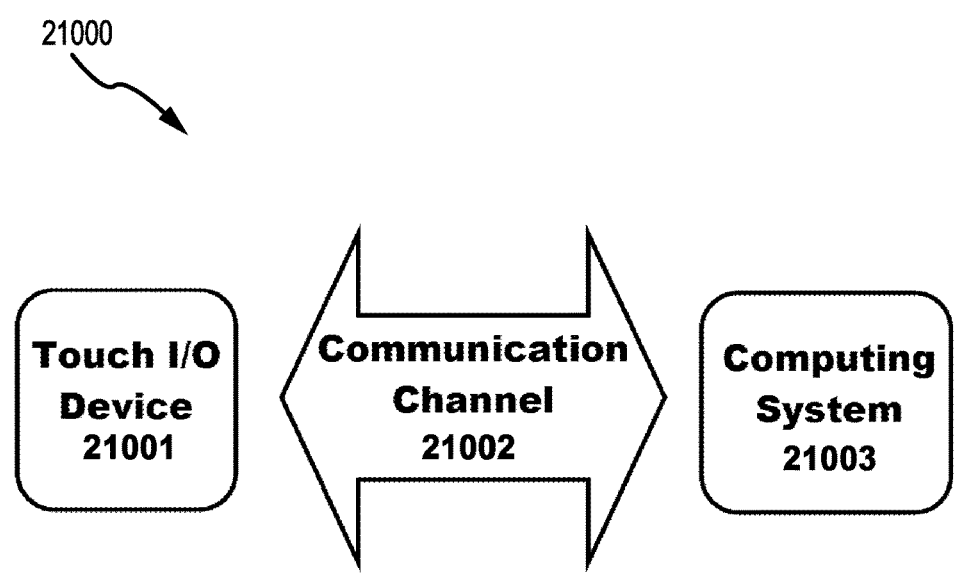
FIG. 21 shows a conceptual drawing of communication between a touch I/O device and a computing system.

FIG. 21 shows a conceptual drawing of communication between a touch I/O device and a computing system.

Figure 22:
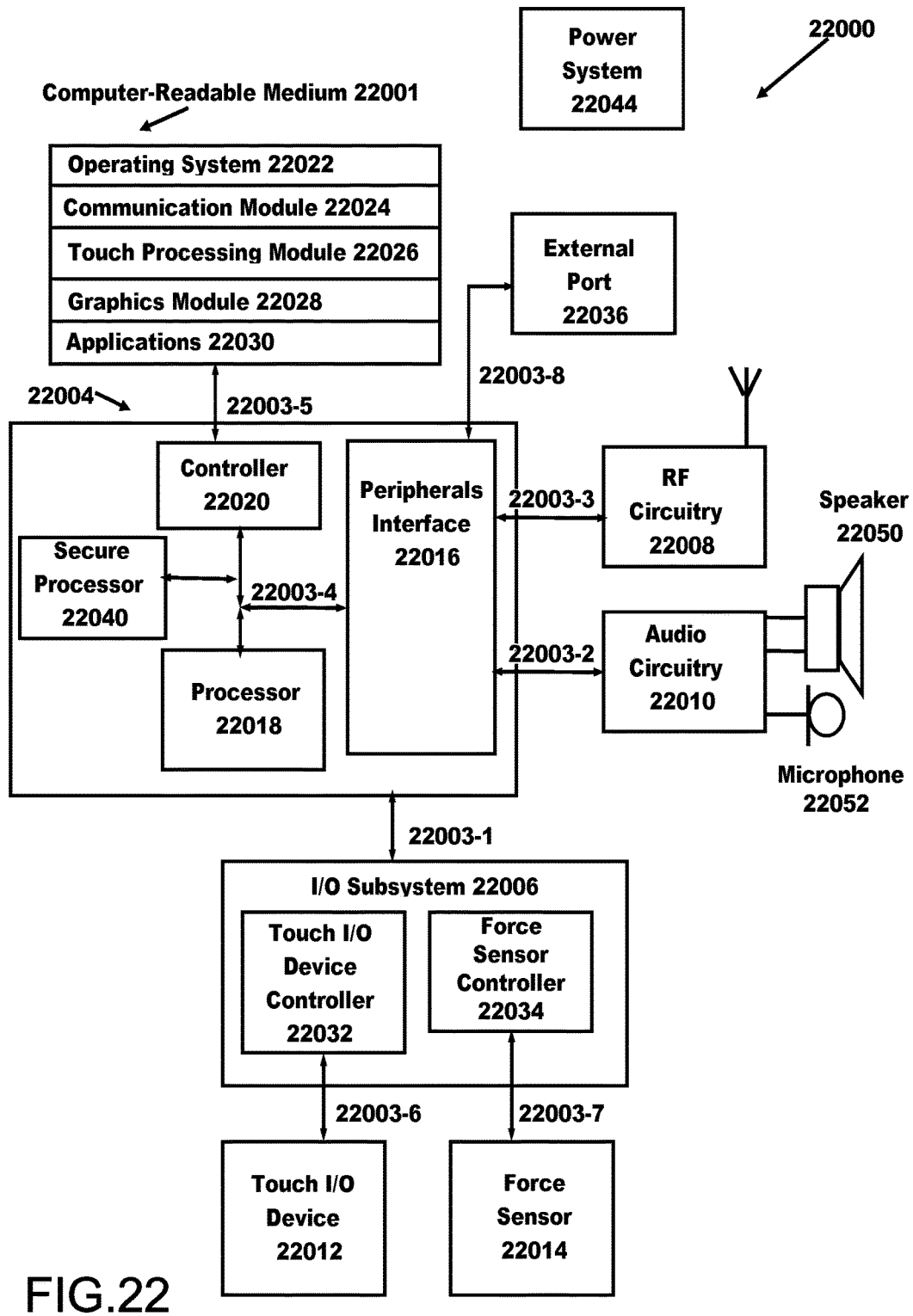
FIG. 22 shows a conceptual drawing of a system including a touch sensing and force sensing I/O device.

FIG. 22 shows a conceptual drawing of a system including a force sensitive touch device.

Described embodiments may include touch I/O device 21001 that can receive touch input and force input (such as possibly including touch locations and force of touch at those locations) for interacting with computing system 21003 (such as shown in the FIG. 1) via wired or wireless communication channel 21002. Touch I/O device 21001 may be used to provide user input to computing system 21003 in lieu of or in combination with other input devices such as a keyboard, mouse, or possibly other devices. In alternative embodiments, touch I/O device 21001 may be used in conjunction with other input devices, such as in addition to or in lieu of a mouse, trackpad, or possibly another pointing device. One or more touch I/O devices 21001 may be used for providing user input to computing system 21003. Touch I/O device 21001 may be an integral part of computing system 21003 (e.g., touch screen on a laptop) or may be separate from computing system 21003.

Touch I/O device 21001 may include a touch sensitive and force sensitive panel which is wholly or partially transparent, semitransparent, non-transparent, opaque or any combination thereof. Touch I/O device 21001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard, disposed on a trackpad or other pointing device), any multi-dimensional object having a touch sensitive surface for receiving touch input, or another type of input device or input/output device.

In one example, touch I/O device 21001 embodied as a touch screen may include a transparent and/or semitransparent touch sensitive and force sensitive panel at least partially or wholly positioned over at least a portion of a display. (Although the touch sensitive and force sensitive panel is described as at least partially or wholly positioned over at least a portion of a display, in alternative embodiments, at least a portion of circuitry or other elements used in embodiments of the touch sensitive and force sensitive panel may be at least positioned partially or wholly positioned under at least a portion of a display, interleaved with circuits used with at least a portion of a display, or otherwise.) According to this embodiment, touch I/O device 21001 functions to display graphical data transmitted from computing system 21003 (and/or another source) and also functions to receive user input. In other embodiments, touch I/O device 21001 may be embodied as an integrated touch screen where touch sensitive and force sensitive components/devices are integral with display components/devices. In still other embodiments a touch screen may be used as a supplemental or additional display screen for displaying supplemental or the same graphical data as a primary display and to receive touch input, including possibly touch locations and force of touch at those locations.

Touch I/O device 21001 may be configured to detect the location of one or more touches or near touches on device 21001, and where applicable, force of those touches, based on capacitive, resistive, optical, acoustic, inductive, mechanical, chemical, or electromagnetic measurements, in lieu of or in combination or conjunction with any phenomena that can be measured with respect to the occurrences of the one or more touches or near touches, and where applicable, force of those touches, in proximity to deice 21001. Software, hardware, firmware or any combination thereof may be used to process the measurements of the detected touches, and where applicable, force of those touches, to identify and track one or more gestures. A gesture may correspond to stationary or non-stationary, single or multiple, touches or near touches, and where applicable, force of those touches, on touch I/O device 21001. A gesture may be performed by moving one or more fingers or other objects in a particular manner on touch I/O device 21001 such as tapping, pressing, rocking, scrubbing, twisting, changing orientation, pressing with varying pressure and the like at essentially the same time, contiguously, consecutively, or otherwise. A gesture may be characterized by, but is not limited to a pinching, sliding, swiping, rotating, flexing, dragging, tapping, pushing and/or releasing, or other motion between or with any other finger or fingers, or any other portion of the body or other object. A single gesture may be performed with one or more hands, or any other portion of the body or other object by one or more users, or any combination thereof.

Computing system 21003 may drive a display with graphical data to display a graphical user interface (GUI). The GUI may be configured to receive touch input, and where applicable, force of that touch input, via touch I/O device 21001. Embodied as a touch screen, touch I/O device 21001 may display the GUI. Alternatively, the GUI may be displayed on a display separate from touch I/O device 21001. The GUI may include graphical elements displayed at particular locations within the interface. Graphical elements may include but are not limited to a variety of displayed virtual input devices including virtual scroll wheels, a virtual keyboard, virtual knobs or dials, virtual buttons, virtual levers, any virtual UI, and the like. A user may perform gestures at one or more particular locations on touch I/O device 21001 which may be associated with the graphical elements of the GUI. In other embodiments, the user may perform gestures at one or more locations that are independent of the locations of graphical elements of the GUI. Gestures performed on touch I/O device 21001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 21003 (e.g., affect a state or mode of a GUI, application, or operating system). Gestures may or may not be performed on touch I/O device 21001 in conjunction with a displayed cursor. For instance, in the case in which gestures are performed on a touchpad, a cursor (or pointer) may be displayed on a display screen or touch screen and the cursor may be controlled via touch input, and where applicable, force of that touch input, on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 21002 in response to or based on the touch or near touches, and where applicable, force of those touches, on touch I/O device 21001. Feedback may be transmitted optically, mechanically, electrically, olfactory, acoustically, haptically, or the like or any combination thereof and in a variable or non-variable manner.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other (portable or non-portable) system or device adaptable to the inclusion of system architecture 22000, including combinations of two or more of these types of devices. FIG. 2 is a block diagram of one embodiment of system 22000 that generally includes one or more computer-readable mediums 22001, processing system 22004, Input/Output (I/O) subsystem 22006, electromagnetic frequency (EMF) circuitry (such as possibly radio frequency or other frequency circuitry) 22008 and audio circuitry 22010. These components may be coupled by one or more communication buses or signal lines 22003. Each such bus or signal line may be denoted in the form 22003-X, where X can be a unique number. The bus or signal line may carry data of the appropriate type between components; each bus or signal line may differ from other buses/lines, but may perform generally similar operations.

It should be apparent that the architecture shown in FIG. 1-2 is only one example architecture of system 22000, and that system 22000 could have more or fewer components than shown, or a different configuration of components. The various components shown in FIG. 1-2 can be implemented in hardware, software, firmware or any combination thereof, including one or more signal processing and/or application specific integrated circuits.

EMF circuitry 22008 is used to send and receive information over a wireless link or network to one or more other devices and includes well-known circuitry for performing this function. EMF circuitry 22008 and audio circuitry 22010 are coupled to processing system 22004 via peripherals interface 22016. Interface 22016 includes various known components for establishing and maintaining communication between peripherals and processing system 22004. Audio circuitry 22010 is coupled to audio speaker 22050 and microphone 22052 and includes known circuitry for processing voice signals received from interface 22016 to enable a user to communicate in real-time with other users. In some embodiments, audio circuitry 22010 includes a headphone jack (not shown).

Peripherals interface 22016 couples the input and output peripherals of the system to processor 22018 and computer-readable medium 22001. One or more processors 22018 communicate with one or more computer-readable mediums 22001 via controller 22020. Computer-readable medium 22001 can be any device or medium that can store code and/or data for use by one or more processors 22018. Medium 22001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 22001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 22018 run various software components stored in medium 22001 to perform various functions for system 22000. In some embodiments, the software components include operating system 22022, communication module (or set of instructions) 22024, touch and force-of-force processing module (or set of instructions) 22026, graphics module (or set of instructions) 22028, and one or more applications (or set of instructions) 22030. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 22001 may store a subset of the modules and data structures identified above. Furthermore, medium 22001 may store additional modules and data structures not described above.

Operating system 22022 includes various procedures, sets of instructions, software components and/or drivers for controlling and managing general system tasks (e.g., memory management, storage device control, power management, etc.) and facilitates communication between various hardware and software components.

Communication module 22024 facilitates communication with other devices over one or more external ports 22036 or via EMF circuitry 22008 and includes various software components for handling data received from EMF circuitry 22008 and/or external port 22036.

Graphics module 22028 includes various known software components for rendering, animating and displaying graphical objects on a display surface. In embodiments in which touch I/O device is a touch sensitive and force sensitive display (e.g., touch screen), graphics module 22028 includes components for rendering, displaying, and animating objects on the touch sensitive and force sensitive display.

One or more applications 22030 can include any applications installed on system 22000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system, also sometimes referred to herein as "GPS"), a music player, and otherwise.

Touch and force-of-force processing module 22026 includes various software components for performing various tasks associated with touch I/O device including but not limited to receiving and processing touch input and force-of-touch input received from I/O device 22012 via touch I/O device controller 22032.

I/O subsystem 22006 is coupled to touch I/O device. The I/O subsystem may be additionally coupled to one or more other I/O devices for controlling or performing various functions. Touch I/O device communicates with processing system 22004 via touch I/O device controller 22032, which includes various components for processing user touch input and force-of-touch input (e.g., scanning hardware). One or more other input controllers receives/sends electrical signals from/to other I/O devices. Other I/O devices may include physical buttons, dials, slider switches, sticks, keyboards, touch pads, additional display screens, or any combination thereof.

If embodied as a touch screen, touch I/O device displays visual output to the user in a GUI. The visual output may include text, graphics, video, and any combination thereof.

Some or all of the visual output may correspond to user-interface objects. Touch I/O device forms a touch-sensitive and force-sensitive surface that accepts touch input and force-of-touch input from the user. Touch I/O device and touch screen controller 22032 (along with any associated modules and/or sets of instructions in medium 22001) detects and tracks touches or near touches, and where applicable, force of those touches (and any movement or release of the touch, and any change in the force of the touch) on touch I/O device and converts the detected touch input and force-of-touch input into interaction with graphical objects, such as one or more user-interface objects. In the case in which device 22012 is embodied as a touch screen, the user can directly interact with graphical objects that are displayed on the touch screen. Alternatively, in the case in which device 22012 is embodied as a touch device other than a touch screen (e.g., a touch pad or trackpad), the user may indirectly interact with graphical objects that are displayed on a separate display screen embodied as a separate I/O device.

Touch I/O device may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device based on the user's touch, and force-of-touch, input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 22000 also includes power system 22044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 22016, one or more processors 22018, and memory controller 22020 may be implemented on a single chip, such as processing system 22004. In some other embodiments, they may be implemented on separate chips.

In one embodiment, an example system includes a force sensor 22014 coupled to the electronic device 21000, such as coupled to a force sensor controller 22034. For example, the force sensor controller 22034 can be included in the I/O subsystem 22006. The force sensor controller 22034 can be coupled to a processor or other computing device, such as the processor 22018 or the secure processor 22040, with the effect that information from the force sensor controller 22034 can be measured, calculated, computed, or otherwise manipulated. In one embodiment, the force sensor 22014 can make use of one or more processors or other computing devices, coupled to or accessible to the electronic device 21000, such as the processor 22018, the secure processor 22040, or otherwise. In alternative embodiments, the force sensor controller 22034 can make use of one or more analog circuits or other specialized circuits, coupled to or accessible to the electronic device 21000, such as might be coupled to the I/O subsystem 22006.

In one embodiment, as described above, the force sensor 22014 determines a measure of applied force from a user contacting the electronic device 21000. When the user applied force to the force sensor 22014, the cover glass displaces, bends, twists or otherwise moves in response to the applied force, pressing an upper support towards a lower support, and compressing a bending beam located between the two. This has the effect that a strain probe can determine an amount of stain applied to the bending beam, thus the amount of applied force which caused that movement. Although reference is made herein to "cover glass," it should be appreciated that the covering element may be any suitable optically-transparent (or near-transparent) material. In some embodiments, sapphire and/or polycarbonate may be used as a covering element. Accordingly, references to a "cover glass" herein are meant to encompass other covering elements, including both sapphire and polycarbonate.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

Alternative Embodiments

After reading this application, those skilled in the art would recognize that techniques for obtaining information with respect to applied force and contact on a touch I/O device, and using that associated information to determine amounts and locations of applied force and contact on a touch I/O device, is responsive to, and transformative of, real-world data such as relative capacitance and compressibility received from applied force or contact by a user's finger, and provides a useful and tangible result in the service of detecting and using applied force and contact with a touch I/O device. Moreover, after reading this application, those skilled in the art would recognize that processing of applied force and contact sensor information by a computing device includes substantial computer control and programming, involves substantial records of applied force and contact sensor information, and involves interaction with applied force and contact sensor hardware and optionally a user interface for use of applied force and contact sensor information.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims. The foregoing description has broad application. Accordingly, the discussion of any embodiment is meant only to be an example and is not intended to suggest that the scope of the disclosure, including the claims, is limited to these examples.

What is claimed is:

1. An electronic device, comprising:
   a frame at least partially enclosing an interior of the electronic device, the frame having an open end;
   a cover glass covering the open end of the frame;
   a plurality of strain probes positioned under the cover glass, between the cover glass and the frame, and arranged to output a plurality of strain signals responsive to one or more forces applied to the electronic device; and
   a force processing module configured to at least calculate an amount of force applied to the electronic device based on the plurality of strain signals.

2. The electronic device of claim 1, wherein:
   the plurality of strain probes is positioned along a set of beams;
   the set of beams is positioned along opposite edges of the frame;
   each beam in the set of beams is rigidly connected to a respective one of the opposite edges of the frame, at each end of the beam.

3. The electronic device of claim 1, wherein the plurality of strain probes is positioned along opposite edges of the frame.

4. The electronic device of claim 1, wherein:
   the plurality of strain probes is positioned along a set of beams; and
   the set of beams is positioned along opposite edges of the frame.

5. The electronic device of claim 4, wherein the set of beams is connected to the opposite edges of the frame.

6. The electronic device of claim 4, wherein each beam in the set of beams is connected to an edge of the frame at each end of the beam.

7. The electronic device of claim 4, wherein each beam in the set of beams is rigidly connected to a respective one of the opposite edges of the frame.

8. The electronic device of claim 4, wherein the set of beams comprises a set of bending beams.

9. The electronic device of claim 4, further comprising:
   a plurality of clips, wherein each clip attaches a beam end to an edge of the frame, each clip having one of the plurality of strain probes disposed thereon.

10. The electronic device of claim 1, further comprising:
    an opaque border region located along a perimeter of the cover glass; wherein,
    the plurality of strain probes is positioned under the opaque border region.

11. An electronic device, comprising:
    a frame at least partially enclosing an interior of the electronic device;
    a cover glass connected to the frame;
    a set of strain probes positioned under the cover glass along a perimeter of the cover glass; wherein:
    the set of strain probes comprise a first strain probe and a second strain probe connected by a first beam, and a third strain probe and a fourth strain probe connected by a second beam.

12. The electronic device of claim 11, further comprising:
    a force processing module configured to calculate an amount of force applied to the electronic device based on a set of strain signals produced by the set of strain probes; wherein:
    the first beam is positioned along a first edge of the frame and connected to the first edge at each end of the first beam; and
    the second beam is positioned along a second edge of the frame, opposite the first edge, and connected to the second edge at each end of the second beam.

13. The electronic device of claim 11, further comprising:
    a force processing module configured to calculate an amount of force applied to the electronic device based on a set of strain signals produced by the set of strain probes.

14. The electronic device of claim 11, wherein the set of strain probes is positioned along opposite edges of the frame.

15. The electronic device of claim 11, wherein:
    the first beam is positioned along a first edge of the frame; and
    the second beam is positioned along a second edge of the frame, the second edge opposite the first edge.

16. The electronic device of claim 15, wherein:
    the first beam is connected to the first edge; and
    the second beam is connected to the second edge.

17. The electronic device of claim 15, wherein:
    the first beam is connected to the first edge at each end of the first beam; and
    the second beam is connected to the second edge at each end of the second beam.

18. The electronic device of claim 15, wherein:
    the first beam is rigidly connected to the first edge; and
    the second beam is rigidly connected to the second edge.

19. The electronic device of claim 11, wherein the first beam and the second beam are bending beams.

20. The electronic device of claim 11, wherein the cover glass is movably connected to the frame.

* * * * *